(12) United States Patent
Ichihara et al.

(10) Patent No.: US 8,229,647 B2
(45) Date of Patent: Jul. 24, 2012

(54) CONTROL APPARATUS FOR MULTI-CYLINDER INTERNAL COMBUSTION ENGINE

(75) Inventors: Takanobu Ichihara, Naka (JP); Kazuhiko Kanetoshi, Hitachinaka (JP); Kozo Katogi, Hitachi (JP); Hiroyuki Takamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 661 days.

(21) Appl. No.: 12/468,611

(22) Filed: May 19, 2009

(65) Prior Publication Data

US 2009/0292440 A1 Nov. 26, 2009

(30) Foreign Application Priority Data

May 21, 2008 (JP) ................. 2008-133091

(51) Int. Cl.
*F02D 41/22* (2006.01)
*F02D 43/00* (2006.01)
*F01L 1/34* (2006.01)

(52) U.S. Cl. ...................................... 701/102
(58) Field of Classification Search .................. 701/102, 701/103–105, 110, 115; 123/480, 491
See application file for complete search history.

(56) References Cited

U.S. PATENT DOCUMENTS

| 4,766,863 | A | * | 8/1988 | Fujimori | ................. | 123/339.21 |
| 5,016,591 | A | * | 5/1991 | Nanyoshi et al. | .......... | 123/406.2 |
| 6,640,778 | B1 | * | 11/2003 | Hori | ............................. | 701/105 |

FOREIGN PATENT DOCUMENTS

| DE | 19524112 A1 | * | 2/1996 |
| JP | 11-351014 A | | 12/1999 |
| JP | 2000-205025 A | | 7/2000 |
| JP | 3861937 B2 | | 10/2006 |

OTHER PUBLICATIONS

Japanese Office Action dated Sep. 27, 2011 (three (3) pages).

* cited by examiner

*Primary Examiner* — Hieu T Vo
(74) *Attorney, Agent, or Firm* — Crowell & Moring LLP

(57) ABSTRACT

Provided is a control apparatus for a multi-cylinder internal combustion engine equipped with fuel injection valves provided respectively for the cylinders including: a revolution measuring means for measuring a revolution speed for a predetermined angle for each cylinder; an inter-cylinder revolution-difference calculating means for calculating, from the measured revolution speed, a difference in revolution speed between a cylinder of current explosion and a cylinder of the previous explosion; an injection amount correcting means for adjusting the average amount of injection of the fuel injection valves of all the cylinders in accordance with the inter-cylinder differences in revolution speed after the cold start of the engine calculated by the inter-cylinder revolution-difference calculating means; an inter-cylinder revolution-difference averaging means for averaging the differences in revolution speed, calculated by the inter-cylinder revolution-difference calculating means, each between the cylinder of current explosion and the cylinder of the previous explosion; and a torque adjusting means for adjusting the torque of each cylinder so that the average value of the inter-cylinder revolution differences calculated by the inter-cylinder revolution-difference averaging means can be reduced close to zero.

9 Claims, 19 Drawing Sheets

THERE ARE NO INTER-CYLINDER DIFFERENCES IN INJECTION AMOUNT

THERE ARE INTER-CYLINDER DIFFERENCES IN INJECTION AMOUNT

WITH INTER-CYLINDER INJECTION AMOUNT CORRECTION

CONTROL APPARATUS FOR MULTI-CYLINDER INTERNAL COMBUSTION ENGINE

BACKGROUND OF THE INVENTION

1. Field of the Invention

The present invention relates to a control apparatus for a multi-cylinder internal combustion engine. Specifically, the present invention relates to a control apparatus for a multi-cylinder internal combustion engine, the control apparatus performing engine control operations such as a fuel-supply control and an ignition-timing control.

2. Description of the Related Art

Gasoline fuels for internal combustion engines have different volatility characteristics. For this reason, when the internal combustion engine is cold-started with less-volatile heavy gasoline, more fuel is deposited on the walls of the intake ports and on the intake valves. Such deposition results in a leaner air-fuel mixture in the combustion chambers (in the cylinders), and the lean air-fuel mixture makes the combustion state poorer. The engine in the poor combustion state may sometimes discharge more unburned gas and may even cause an unintended drop of the engines speed.

In addition, characteristic variations of components such as the fuel injection valves, the air-flow meters to measure the air volume, the intake-pipe pressure sensors, and the pressure regulators, also cause a lean air-fuel mixture in the combustion chambers, thus resulting in similar problems to those described above.

At the moment when the internal combustion engine is cold-started, the sensors to detect the air-fuel ratio have not been activated yet and, accordingly, the air-fuel ratio cannot be detected for a while. The impossibility of detecting the air-fuel ratio, if combined with the use of the less-volatile heavy gasoline, may result in the production of a lean air-fuel mixture and thereby result in unstable combustion. A common practice to avoid such unfavorable unstable combustion is to increase the amount of fuel injection in conjunction with the use of the heavy gasoline. Such a practice, however, renders the air-fuel mixture richer than the theoretical air-fuel ratio in a case where the engine is started by supplying more volatile light or standard gasoline. The rich air-fuel mixture in this case results in an increase in the amount of discharge of unburned gas (HC).

Various fuel control apparatuses have been developed to address the problem of the fluctuation in the air-fuel ratio attributable to the above-described differences in fuel properties or in component characteristics. One of such fuel control apparatuses prevents the air-fuel ratio from becoming either leaner or richer excessively by controlling the amount of fuel injection as follows. Specifically, the apparatus detects the revolution speed (the angular velocity of the crankshaft by a predetermined crank angle) at every single explosion, and controls, once the engine is started, the amount of the fuel injection for the next explosion in accordance with the change in the revolution speed calculated on the basis of the revolution speed of the current explosion and that of the previous explosion (see, Japanese Patent No. 3861937).

A lean air-fuel mixture supplied to the combustion chambers most probably results in an unstable combustion state and thus increases the amount of change for each explosion in the internal pressure of the cylinder. Accordingly, the fuel control apparatus such as one disclosed in Japanese Patent No. 3861937 controls the amount of fuel injection on the basis of the estimation of the air-fuel ratio of the air-fuel mixture while the air-fuel ratio is estimated by detecting the differences in the revolution speed between cylinders of consecutive explosions (inter-cylinder differences in revolution).

The control apparatus disclosed in Japanese Patent No. 3861937 compares, with a predetermined threshold value, either values of the inter-cylinder differences in revolution or their respective averaging values of inter-cylinder differences in revolution. When a value of the inter-cylinder difference in revolution is larger than the predetermined threshold value, it is determined that the air-fuel ratio is lean. Thus, the control apparatus executes a correction to increase the amount of fuel by a predetermined proportion, and thereby prevents the air-fuel ratio from becoming excessively lean. In contrast, when a value of the inter-cylinder difference in revolution is smaller than the predetermined threshold value, it is determined that the air-fuel ratio is rich. Thus, the control apparatus executes a correction to decrease the amount of fuel by a predetermined proportion, and thereby suppresses an increase in the amount of HC discharge due to the excessively-rich air-fuel mixture.

SUMMARY OF THE INVENTION

According to the technique disclosed in Japanese Patent No. 3861937 and the like, the amount of fuel injection (air-fuel ratio) is controlled so as to make the air-fuel ratio at a ratio around the theoretical air-fuel ratio that is suitable for reducing HC discharge, and the control is executed on the basis of the air-fuel ratio estimated by use of the inter-cylinder differences in revolution during idling after the cold start of the engine. In this respect, the inter-cylinder difference in revolution derives not only from the unstable combustion state caused by a lean air-fuel mixture but also from the differences in the average torque generated by each cylinder (inter-cylinder difference in average torque).

For example, suppose a case where the fuel injection valves having different characteristics inject different amounts of fuel into their respective cylinders. In this case, the inter-cylinder differences in average torque increase. Then, even when the air-fuel ratio is not lean and the combustion is stable, the inter-cylinder differences in revolution increase. Such an increase in the inter-cylinder differences in revolution sometimes leads to an erroneous determination that the air-fuel mixture is lean. Such an erroneous determination may probably results in an excessive increase in the amount of fuel injection. As a consequence, the air-fuel mixture becomes so rich that the amount of unburned gas (HC) discharge is increased.

When the amounts of fuel injection into the respective cylinders are equal to one another, a higher correlation is observed between the average air-fuel ratio of all the cylinders and the inter-cylinder differences in revolution, as shown in FIG. 4. In this case, the air-fuel ratio can be estimated on the basis of the inter-cylinder differences in revolution. In contrast, when the amounts of fuel injection into the respective cylinders have a variation, there are inter-cylinder differences in average torque. In this case, as FIG. 5 shows, even when the average air-fuel ratio of all the cylinders is richer than the theoretical air-fuel ratio (14.5) that allows stable combustion, the inter-cylinder differences in revolution become larger. The large revolution differences make it more difficult to distinguish this rich air-fuel ratio from a lean air-fuel ratio that makes the combustion actually unstable (for example, an air-fuel ratio of 16). To put it differently, in this case, the average air-fuel ratio and the inter-cylinder differences in revolution are poorly correlated with each other, so that the estimation of the air-fuel ratio becomes less accurate.

As a consequence, an erroneous determination is sometimes made that the air-fuel ratio is lean even though the air-fuel ratio is actually rich, resulting in an excessive increase in the amount of fuel injection and thus an increase in the amount of HC discharge.

The inventors carried out an experiment, which revealed the following fact—executed after the cold start of the engine—of the amount of fuel injection on the basis of the inter-cylinder differences in revolution. Even when the inter-cylinder differences in the amount of fuel injection were within a range of approximately ±4%, and the combustion was stable, the inter-cylinder differences in revolution increased and the increase brought about an increase in the amount of fuel injection. The increased amount of fuel injection resulted in the average air-fuel ratio of all the cylinders that was richer than the theoretical air-fuel ratio by approximately 7%.

As a consequence, an excessively increased amount of the fuel was injected into all the cylinders including the ones with injection of a smaller amount of fuel. The excessively increased amount of fuel resulted in a significant increase in the unburned gas (HC) discharge from the case with no inter-cylinder difference in the amount of fuel injection.

In addition to inter-cylinder differences in the amount of fuel injection, the inter-cylinder differences in air volume and the inter-cylinder differences in compression ratio can cause the inter-cylinder differences in average torque. The experiment of the inventors also revealed that, even in the cases of average-torque difference due to these two causes, an increase in the inter-cylinder differences in revolution and the enriching of the average air-fuel ratio were observed as in the case of the inter-cylinder difference in the amount of fuel injection.

The present invention has been made in view of the above-described problems to provide a control apparatus for a multi-cylinder internal combustion engine with the following features. Firstly, the provided control apparatus is suitable for the use as a control apparatus of a multi-cylinder internal combustion engine that executes a fuel control to adjust the average amount of fuel injection of all the cylinders on the basis of the inter-cylinder differences in revolution. Secondly, the provided control apparatus can prevent the fuel from being increased even in the cases where the inter-cylinder differences in torque generated in each cylinder are caused by any other reasons than the unstable combustion, and thereby the provided control apparatus can prevent the air-fuel mixture from becoming excessively rich and can also prevent an increase in the amount of the unburned gas discharge.

To accomplish the above-mentioned objects, a first aspect of the present invention provides a control apparatus for a multi-cylinder internal combustion engine equipped with fuel injection valves provided respectively for the cylinders including: a revolution measuring means for measuring a revolution speed for a predetermined angle for each cylinder; an inter-cylinder revolution-difference calculating means for calculating, from the measured revolution speed, a difference in revolution speed between a cylinder of current explosion and a cylinder of the previous explosion; an injection amount correcting means for adjusting the average amount of injection of the fuel injection valves of all the cylinders in accordance with the inter-cylinder differences in revolution speed after the cold start of the engine calculated by the inter-cylinder revolution-difference calculating means; an inter-cylinder revolution-difference averaging means for averaging the differences, calculated by the inter-cylinder revolution-difference calculating means, each between the revolution speed of the cylinder of current explosion and the revolution speed of the cylinder of the previous explosion; and a torque adjusting means for adjusting the torque of each cylinder so that the average value of the inter-cylinder revolution differences calculated by the inter-cylinder revolution-difference averaging means can be reduced close to zero.

A second aspect of the present invention provides a control apparatus for a multi-cylinder internal combustion engine equipped with fuel injection valves provided respectively for the cylinders including: a revolution measuring means for measuring a revolution speed for a predetermined angle for each cylinder; an inter-cylinder revolution-difference calculating means for calculating, from the measured revolution speed, a difference in revolution speed between a cylinder of current explosion and a cylinder of the previous explosion; an injection amount correcting means for adjusting the average amount of injection of the fuel injection valves of all the cylinders in accordance with the inter-cylinder differences in revolution speed after the cold start of the engine calculated by the inter-cylinder revolution-difference calculating means; an inter-cylinder revolution-difference averaging means for averaging the differences, calculated by the inter-cylinder revolution-difference calculating means, each between the revolution speed of the cylinder of current explosion and the revolution speed of the cylinder of the previous explosion; and an inter-cylinder injection amount correcting means for adjusting the amount of injection of the fuel injection valve of each cylinder so that the average value of the inter-cylinder revolution differences calculated by the inter-cylinder revolution-difference averaging means can be reduced close to zero.

A third aspect of the present invention provides a control apparatus for a multi-cylinder internal combustion engine wherein, when the average air-fuel ratio of all the cylinders is leaner than the air-fuel ratio for the maximum torque generation, the inter-cylinder injection amount correction means adjusts the amount of injection of the fuel injection valve of each cylinder so that the average value of the inter-cylinder revolution differences calculated by the inter-cylinder revolution-difference averaging means can be reduced close to zero.

A fourth aspect of the present invention provides a control apparatus for a multi-cylinder internal combustion engine wherein the inter-cylinder injection amount correcting means calculates a correction value for the amount of injection of the fuel injection valve of each cylinder so that the average value of the inter-cylinder revolution differences calculated by the inter-cylinder revolution-difference averaging means can be reduced close to zero. The inter-cylinder injection amount correcting means adjusts the amount of injection of the fuel injection valve of each cylinder by use of the calculated correction value for the amount of injection of each cylinder. The inter-cylinder injection amount correcting means stores the correction value for the amount of injection of each cylinder in a memory. At a start of the engine after the correction value for the amount of injection of each cylinder is stored in the memory, the inter-cylinder injection amount correcting means adjusts the amount of injection of the fuel injection valve by use of the correction value for the amount of injection of each cylinder stored in the memory until the predetermined length of time has passed since the start of the engine.

A fifth aspect of the present invention provides a control apparatus for a multi-cylinder internal combustion engine wherein while a feedback control of the amount of injection is executed by use of an air-fuel sensor so that a predetermined target air-fuel ratio that is leaner than an air-fuel ratio for the maximum torque generation can be accomplished, the inter-cylinder injection amount correcting means calculates the correction value for the amount of injection of each cylinder so that the average value of the inter-cylinder revolution differences calculated by the inter-cylinder revolution-difference averaging means can be reduced close to zero. The inter-cylinder injection amount correcting means stores the correction value for the amount of injection of each cylinder in a memory. At a start of the engine after the correction value for the amount of injection of each cylinder is stored in the memory, the inter-cylinder injection amount correcting means adjusts the amount of injection of the fuel injection valve by use of the correction value for the amount of injection of each cylinder stored in the memory from the start of the engine until the start of the feedback control of the amount of injection by use of the air-fuel ratio sensor.

A sixth aspect of the present invention provides a control apparatus for a multi-cylinder internal combustion engine equipped with fuel injection valves provided respectively for the cylinders including: a revolution measuring means for measuring a revolution speed for a predetermined angle for each cylinder; an inter-cylinder revolution-difference calculating means for calculating, from the measured revolution speed, a difference in revolution speed between a cylinder of current explosion and a cylinder of the previous explosion; an injection amount correcting means for adjusting the average amount of injection of the fuel injection valves of all the cylinders in accordance with the inter-cylinder differences in revolution speed after the cold start of the engine calculated by the inter-cylinder revolution-difference calculating means; an inter-cylinder revolution-difference averaging means for averaging the differences, calculated by the inter-cylinder revolution-difference calculating means, each between the revolution speed of the cylinder of current explosion and the revolution speed of the cylinder of the previous explosion; and an inter-cylinder ignition-timing correcting means for adjusting the ignition timing of each cylinder so that the average value of the inter-cylinder revolution differences calculated by the inter-cylinder revolution-difference averaging means can be reduced close to zero.

A seventh aspect of the present invention provides a control apparatus for a multi-cylinder internal combustion engine equipped with fuel injection valves provided respectively for the cylinders including: a revolution measuring means for measuring a revolution speed for a predetermined angle for each cylinder; an inter-cylinder revolution-difference calculating means for calculating, from the measured revolution speed, a difference in revolution speed between a cylinder of current explosion and a cylinder of the previous explosion; an injection amount correcting means for adjusting the average amount of injection of the fuel injection valves of all the cylinders in accordance with the inter-cylinder differences in revolution speed after the cold start of the engine calculated by the inter-cylinder revolution-difference calculating means; an inter-cylinder revolution-difference averaging means for averaging the differences, calculated by the inter-cylinder revolution-difference calculating means, each between the revolution speed of the cylinder of current explosion and the revolution speed of the cylinder of the previous explosion; an inter-cylinder ignition-timing correcting means for adjusting the ignition timing of each cylinder so that the average value of the inter-cylinder revolution differences calculated by the inter-cylinder revolution-difference averaging means can be reduced close to zero from the start of the engine until the average air-fuel ratio of all the cylinders becomes leaner than the air-fuel ratio for the maximum torque generation; and an inter-cylinder injection amount correcting means for adjusting the amount of injection of the fuel injection valve of each cylinder so that the average value of the inter-cylinder revolution differences calculated by the inter-cylinder revolution-difference averaging means can be reduced close to zero once the average air-fuel ratio of all the cylinders has become leaner than an air-fuel ratio for the maximum torque generation after the start of the engine.

A eighth aspect of the present invention provides a control apparatus for a multi-cylinder internal combustion engine equipped with fuel injection valves provided respectively for the cylinders including: a revolution measuring means for measuring a revolution speed for a predetermined angle for each cylinder; an inter-cylinder revolution-difference calculating means for calculating, from the measured revolution speed, a difference in revolution speed between a cylinder of current explosion and the revolution speed of a cylinder of the previous explosion; an injection amount correcting means for adjusting the average amount of injection of the fuel injection valves of all the cylinders in accordance with the inter-cylinder differences in revolution speed after the cold start of the engine calculated by the inter-cylinder revolution-difference calculating means; an inter-cylinder revolution-difference averaging means for averaging the differences, calculated by the inter-cylinder revolution-difference calculating means, each between the revolution speed of the cylinder of current explosion and the revolution speed of the cylinder of the previous explosion; and a torque adjusting means for adjusting the torque of each cylinder so that the average value of the inter-cylinder revolution differences calculated by the inter-cylinder revolution-difference averaging means can be reduced close to zero once a predetermined delay period has passed from the start of the engine.

According to the control apparatus for a multi-cylinder internal combustion engine of the first aspect, in a multi-cylinder internal combustion engine that adjusts the average amount of injection of all the cylinders on the basis of the inter-cylinder revolution difference at the cold start of the engine, even when factors other than an unstable combustion state cause inter-cylinder torque differences, the average air-fuel ratio can be prevented from becoming richer, and an increase in the unburned-gas discharge can be avoided.

According to the control apparatus for a multi-cylinder internal combustion engine of the second aspect, in a multi-cylinder internal combustion engine that adjusts the average amount of injection of all the cylinders on the basis of the inter-cylinder revolution difference at the cold start of the engine, even when factors other than an unstable combustion state cause inter-cylinder torque differences, the air-fuel ratio can be prevented from becoming richer, and the inter-cylinder differences in the amount of fuel injection can be reduced. As a consequence, an increase in the unburned-gas discharge that would be caused by a rich air-fuel mixture supplied to a part of the cylinders can be avoided.

According to the control apparatus for a multi-cylinder internal combustion engine of the third aspect, in a multi-cylinder internal combustion engine that adjusts the average amount of injection of all the cylinders on the basis of the inter-cylinder revolution difference at the cold start of the engine, even when factors other than an unstable combustion state cause inter-cylinder torque differences, the correction value for the amount of injection of each cylinder used for reducing the inter-cylinder differences in torque can be calculated accurately.

According to the control apparatus for a multi-cylinder internal combustion engine of the fourth aspect, in a multi-cylinder internal combustion engine that adjusts the average amount of injection of all the cylinders on the basis of the inter-cylinder revolution difference at the cold start of the engine, even when factors other than an unstable combustion state cause inter-cylinder torque differences, the air-fuel ratio is prevented from becoming richer immediately after the cold start of the engine once the correction value for the amount of injection of each cylinder has been stored in the memory.

According to the control apparatus for a multi-cylinder internal combustion engine of the fifth aspect, in a control apparatus for an internal combustion engine that adjusts the average amount of injection of all the cylinders on the basis of the inter-cylinder revolution difference at the cold start of the engine, even when factors other than an unstable combustion state cause inter-cylinder torque differences, the correction value for the amount of injection of each cylinder used for reducing the inter-cylinder differences in torque can be calculated more accurately.

According to the control apparatus for a multi-cylinder internal combustion engine of the sixth aspect, in a multi-cylinder internal combustion engine that adjusts the average amount of injection of all the cylinders on the basis of the inter-cylinder revolution difference at the cold start of the engine, when factors other than an unstable combustion state cause inter-cylinder torque differences, the air-fuel ratio is prevented from becoming richer immediately after the cold start of the engine immediately after the initialization of the memory.

According to the control apparatus for a multi-cylinder internal combustion engine of the seventh aspect, in a multi-cylinder internal combustion engine that adjusts the average amount of injection of all the cylinders on the basis of the inter-cylinder revolution difference at the cold start of the engine, when factors other than an unstable combustion state cause inter-cylinder torque differences, the air-fuel ratio is prevented from becoming richer immediately after the cold start of the engine immediately after the initialization of the memory. In addition, once the correction value for the amount of injection of each cylinder has been calculated, the inter-cylinder differences in the amount of fuel injection can be reduced. As a consequence, the unburned-gas discharge amount can be minimized.

According to the control apparatus for a multi-cylinder internal combustion engine of the eighth aspect, in a multi-cylinder internal combustion engine that adjusts the average amount of injection of all the cylinders on the basis of the inter-cylinder revolution difference at the cold start of the engine, even when factors other than an unstable combustion state cause inter-cylinder torque differences, the torque-control parameter of each cylinder used for reducing the inter-cylinder differences in torque can be calculated more accurately.

An increase in the unburned-gas discharge amount can be avoided by applying the present invention to the configuration including: a revolution measuring means for detecting the revolution speed of the internal combustion engine; and a control apparatus that controls the amount of fuel injection in response to the signal sent from the revolution measuring means.

DESCRIPTION OF THE PREFERRED EMBODIMENTS

Hereinafter, embodiments of a control apparatus for a multi-cylinder internal combustion engine of the present invention will be described with reference to the drawings.

Figure 1:
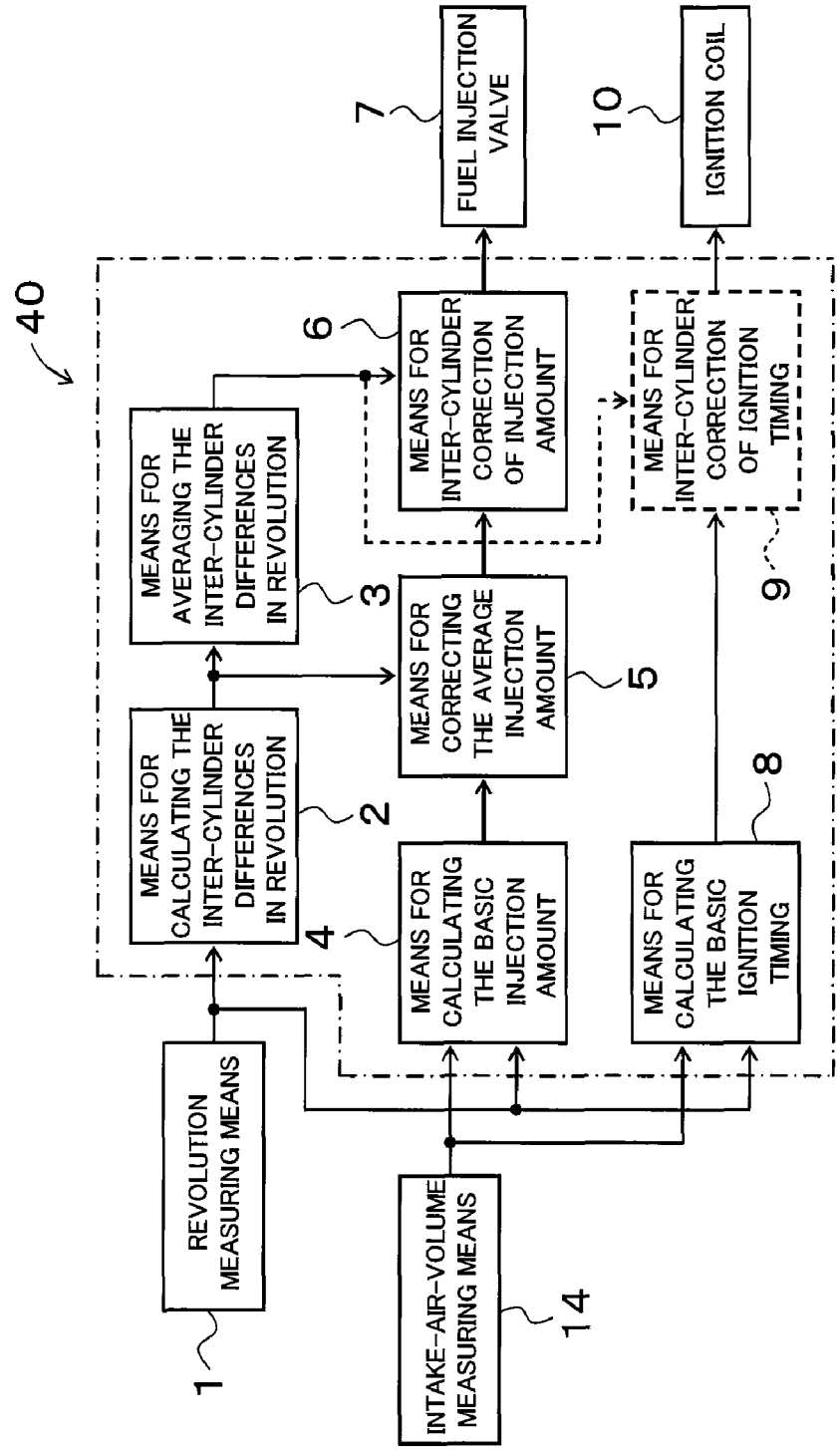
FIG. 1 is a configuration diagram illustrating a control apparatus for a multi-cylinder internal combustion engine according to an embodiment of the present invention.

FIG. 1 illustrates the configuration of a control apparatus for a multi-cylinder internal combustion engine of the present invention. The control apparatus includes a controller 40 equipped with a microcomputer. The controller 40 receives a signal sent from a revolution measuring means 1 and representing the revolution speed for a predetermined crank angle. The controller 40 also receives a signal sent from an intake-air-volume measuring means 14 and representing the volume of the intake air. The revolution measuring means 1 detects the revolution speed (the revolution speed for a predetermined crank angle) for every single explosion of the multi-cylinder internal combustion engine.

The controller 40 includes a means 2 for calculating the inter-cylinder differences in revolution, a means 3 for averaging the inter-cylinder differences in revolution, a means 4 for calculating the basic injection amount, a means 5 for correcting the average injection amount, a means 6 for inter-cylinder correction of injection amount, a means 8 for calculating the basic ignition timing, and a means 9 for inter-cylinder correction of ignition timing.

The means 2 for calculating the inter-cylinder differences in revolution calculates, as an inter-cylinder difference in revolution, the difference in revolution speed between the cylinder of the current explosion and the cylinder of the previous explosion.

The means 3 for averaging the inter-cylinder differences in revolution averages, over predetermined cycles, the inter-cylinder differences in revolution speed calculated by the means 2 for calculating the inter-cylinder differences in revolution. Thus obtained are indices each of which corresponds to the difference between the average torque of the corresponding one of the cylinders and the average torque of all the cylinders.

The means 4 for calculating the basic injection amount calculates a basic injection amount on the basis of the driving state—for example, on the basis of the revolution speed (engine speed) detected by the revolution measuring means 1 and of the intake-air volume detected by the intake-air-volume measuring means 14.

The means 5 for correcting the average injection amount is a fuel-injection correcting means for adjusting the amount of fuel injection in accordance with the inter-cylinder differences in revolution speed after the cold start of the engine. The means 5 for correcting the average injection amount receives the inter-cylinder differences in revolution speed calculated by the means 2 for calculating the inter-cylinder differences in revolution. During idling after the cold start of the engine, the average air-fuel ratio of all the cylinders is estimated on the basis of either values of the inter-cylinder differences in revolution speed or their respective averaging values, and thereby the means 5 for correcting the average injection amount adjusts the amount of fuel injection for all the cylinders. To be more specific, the fuel-injection adjustment is executed in the following way. Firstly, a predetermined threshold value is compared with each value of the inter-cylinder differences in revolution speed or their respective averaging value. If the inter-cylinder difference value in revolution exceeds the threshold value, it is determined that the air-fuel ratio is lean. With this determination, a correction is executed so as to increase the average amount of the fuel injection for all the cylinders by a predetermined proportion to the basic injection amount. In contrast, if the inter-cylinder difference value in revolution does not exceed the threshold value, it is determined that the air-fuel ratio is rich. With this determination, a correction is executed so as to decrease the average amount of the fuel injection for all the cylinders by a predetermined proportion.

The means 6 for inter-cylinder correction of injection amount corrects the amount of fuel injection to each of the cylinders so that the average value for the inter-cylinder differences in revolutions can be reduced close to zero, that is, so that the inter-cylinder differences in average torque can be reduced. The corrected amounts of fuel injection are outputted, as applied pulse widths, to fuel injection valves 7, respectively.

The means 8 for calculating the basic ignition timing calculates the basic ignition timing on the basis of the driving state—for example, on the basis of the revolution speed (engine speed) detected by the revolution measuring means 1 and of the intake-air volume detected by the intake-air-volume measuring means 14.

The means 9 for inter-cylinder correction of ignition timing is provided as needed basis, and corrects the ignition timing of each of the cylinders so that the average value for the inter-cylinder differences in revolutions can be reduced close to zero, that is, so that the inter-cylinder differences in average torque can be reduced. The means 9 for inter-cylinder correction of ignition timing outputs ignition-timing instructing signals to ignition coils 10, respectively.

The study of the inventors revealed that, in a case where characteristic differences among the fuel injection valves 7 caused inter-cylinder differences in the amount of fuel injection, the inter-cylinder differences in torque increased despite the fact that the air-fuel ratio was not lean and that the combustion was stable. Accordingly, the inter-cylinder differences in revolution also increased. Due to the increased inter-cylinder differences in revolution, the air-fuel ratio was estimated less accurately than otherwise.

Accordingly, if there are inter-cylinder differences in the amount of fuel injection, executing the correction of injection amount on the basis of the inter-cylinder differences in revolution leads to an erroneous determination that the air-fuel ratio is lean. The erroneous determination leads to an excessive increase in the amount of fuel injection, and the excessive increase of the fuel results in an increase in the amount of HC discharge.

In addition, the study of the inventors revealed that, besides the inter-cylinder difference in the amount of fuel injection, such factors as the inter-cylinder differences in air volume and the inter-cylinder differences in compression ratio caused an increase in the inter-cylinder differences in revolution despite the fact that the air-fuel ratio was not lean. Due to the increased inter-cylinder differences in revolution, the air-fuel ratio was estimated only with a lower accuracy than otherwise.

Accordingly, when the average fuel injection amount of all the cylinders (average air-fuel ratio) is controlled on the basis of the inter-cylinder differences in revolution, an increase in the inter-cylinder difference in torque caused by other factors than the unstable combustion with a lean air-fuel ratio results in a control error of the air-fuel ratio in executing the correction of the fuel injection amount on the basis of the inter-cylinder differences in revolution.

In addition, the experiment performed by the inventors revealed the following fact. Since the existence of such other torque-varying factors than the unstable combustion as ones described above results in continuous occurrence of the inter-cylinder differences in torque, an increase was observed in the value obtained by averaging the inter-cylinder differences in revolution over several tens of cycles (hereinafter, referred to as the average value for the inter-cylinder differences in revolution).

Figure 5:
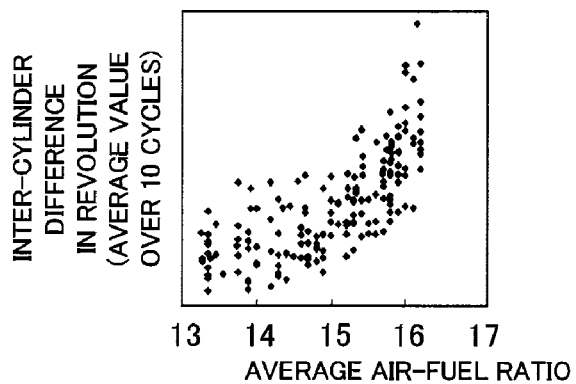
FIG. 5 is a graph illustrating the relationship between the average air-fuel ratio and the inter-cylinder difference in revolution in a case where there are inter-cylinder differences in the amount of fuel injection.
Figure 6:
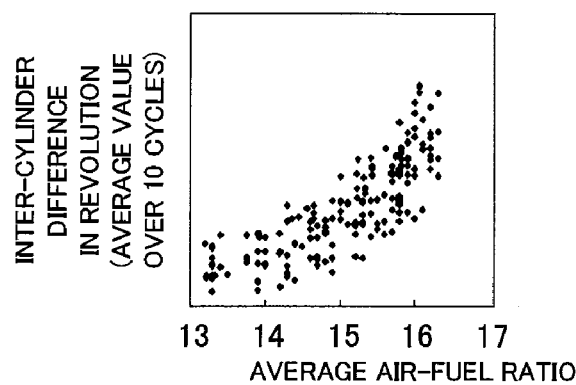
FIG. 6 is a graph illustrating the relationship between the average air-fuel ratio and the inter-cylinder difference in revolution in a case where the control of the present invention is applied.

Accordingly, the control apparatus for a multi-cylinder internal combustion engine of the present invention calculates the average value for the inter-cylinder differences in revolution and then to control either the fuel injection amount for each of the cylinders or the ignition timing for each of the cylinders so that the average value for the inter-cylinder differences in revolution can be reduced close to zero. This configuration resulted in such a better correlation as one shown in FIG. 6 between the average air-fuel ratio and the inter-cylinder differences in revolution than the corresponding correlation shown in FIG. 5 even when the inter-cylinder differences in torque was caused by factors other than the unstable combustion. In addition, the configuration resulted in higher accuracy in the estimation of the air-fuel ratio.

A possible explanation for the improvement in the correlation and the improvement in the accuracy is as follows. Since either the amount of fuel injection or the ignition timing was controlled so that the average value for the inter-cylinder differences in revolution could be reduced close to zero, a decrease was accomplished in the inter-cylinder differences in torque (the inter-cylinder differences in revolution) caused by the factors other than the unstable combustion. As a consequence, the inter-cylinder differences in torque (the inter-cylinder differences in revolution) became better correlated with the fluctuations in the combustion state caused by a lean air-fuel ratio.

Note that, the unstable combustion caused by the lean air-fuel ratio may also results in an increase in the average value for the differences in revolution of a part of the cylinders. When a control is executed so that the average value for the differences in revolution of the cylinder can be reduced close to zero, the inter-cylinder differences in revolution may decrease, resulting in a lower correlation between the air-fuel ratio and the inter-cylinder differences in revolution. The experiment of the inventors, however, revealed that this was not the case. Specifically, when either the amount of fuel injection for each of the cylinders or the ignition timing for each of the cylinders was controlled so that the average value for the differences in revolution of each cylinder could be reduced close to zero, the lowering of the accuracy was hardly observed in the estimation of the average air-fuel ratio and no increase in the control error of the air-fuel ratio was observed.

Subsequently, the configuration of an engine (multi-cylinder internal combustion engine) to which the control apparatus of the present invention is applied will be described with reference to FIG. 2. An intake pipe 11 is provided with an intake-pipe pressure sensor 19, which is an intake-air-volume measuring means 14 that detects the intake-air volume. The intake pipe 11 is also provided with a throttle valve 12 that controls the intake-air volume for the engine.

The air is inducted into a combustion chamber 24 through an intake manifold 13 and an intake port 16. A fuel injection valve 7 is disposed at the upstream side of the intake port 16. The fuel injection valve 7 injects the fuel towards an intake valve 15. Note that the present invention may be applied to an engine of the gasoline direct injection type—an engine having the fuel injection valve 7 which is disposed in a cylinder block 20 and which injects the fuel directly into the combustion chamber 24.

Figure 2:
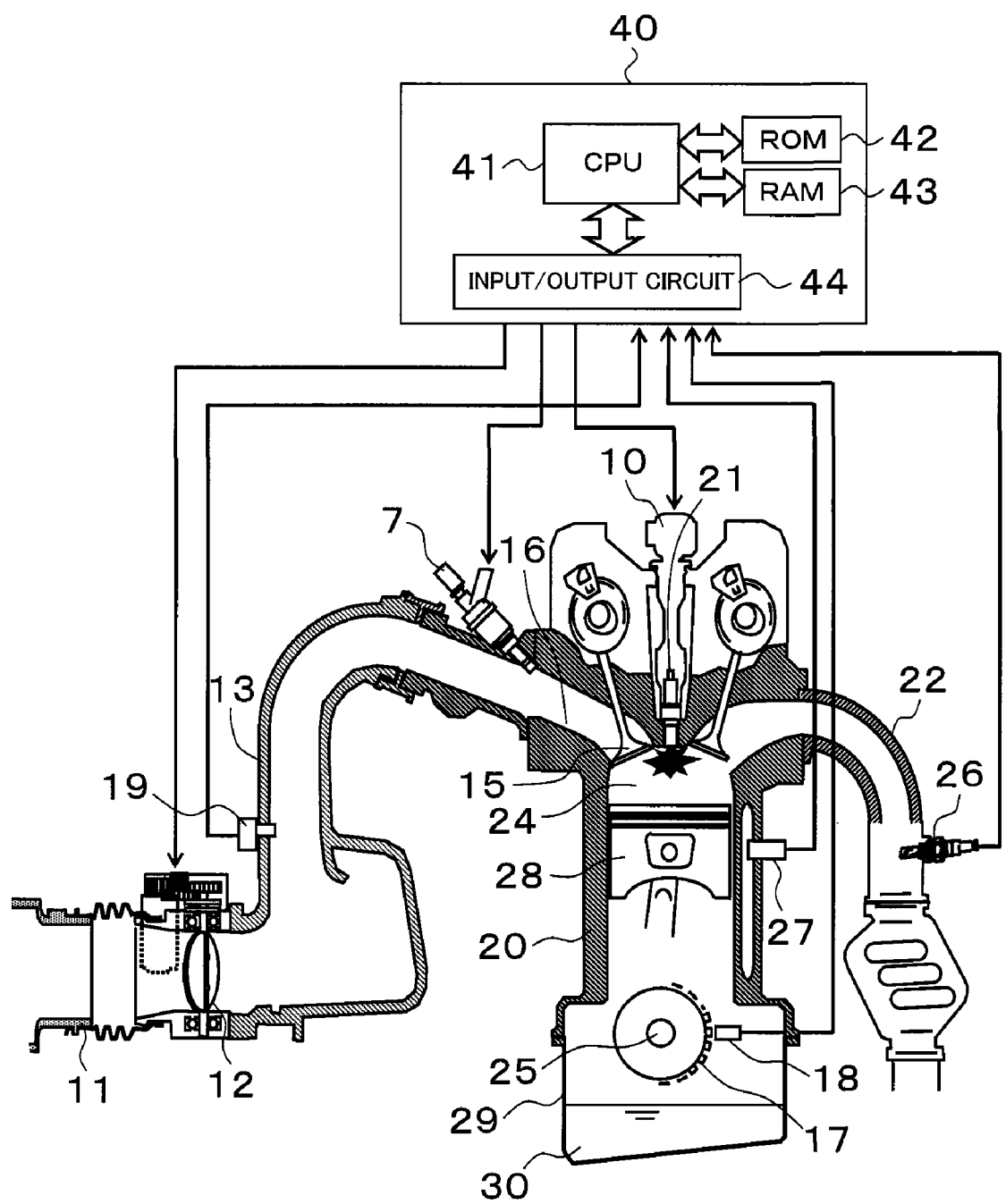
FIG. 2 is a configuration diagram illustrating a multi-cylinder internal combustion engine according to an embodiment to which a control apparatus of the present invention is applied.

FIG. 2 shows only the configuration related to a single cylinder, but the engine of the present invention is a multi-cylinder internal combustion engine (four-cylinder engine, in this embodiment) having plural (four, in this embodiment) combustion chambers 24 each of which is provided with a single fuel injection valve 7.

A crank-angle detecting plate 17, which serves as the revolution measuring means 1, is attached to a crankshaft 25 of the engine. A crank-angle sensor 18 is provided so as to face the crank-angle detecting plate 17. Spark plugs 21 are provided respectively to the cylinders, and likewise, ignition coils 10 are provided respectively to the cylinders.

A cooling-water temperature sensor 27 is attached to the engine and detects the temperature of the cooling water. An air-fuel ratio sensor 26 is disposed in an exhaust pipe 22 of the engine.

Signals are inputted into the controller (control apparatus) 40 from the intake-pipe pressure sensor 19, the cooling-water temperature sensor 27, the crank-angle sensor 18, the air-fuel ratio sensor 26, and the like. The controller 40 calculates the amount of fuel injection, the ignition timing, and the throttle-valve angle from their respective inputted signals, and then outputs the control signals respectively to the fuel injection valves 7, the ignition coils 10, and the throttle valve 12.

The controller 40 is a microcomputer-type controller and includes a CPU 41, a read-only memory (ROM) 42, a random access memory (RAM) 43, and an input/output circuit 44. The ROM 42 stores control programs and the data for control while the RAM 43 stores control parameters and the like.

Figure 3:
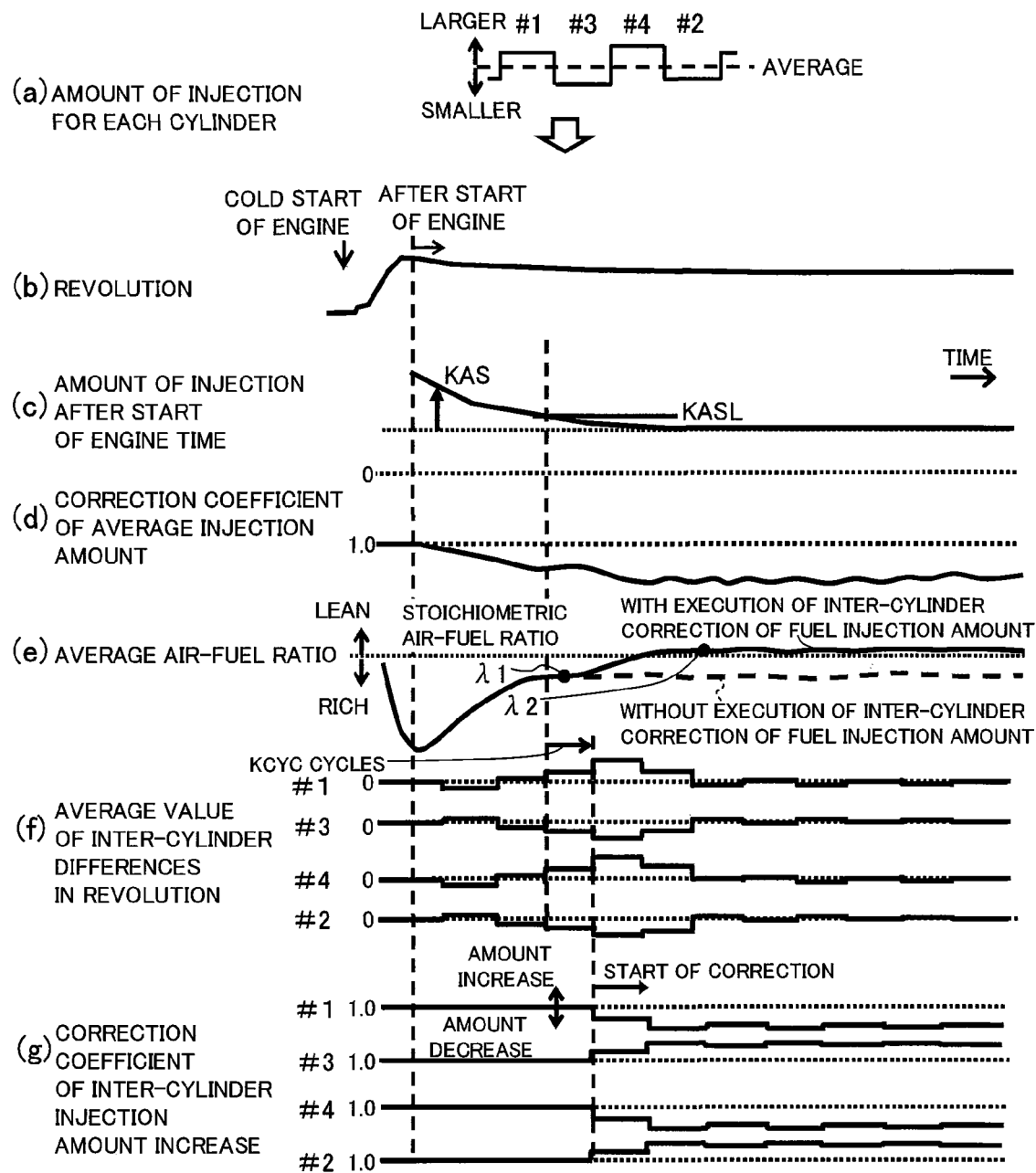
FIG. 3 is a time chart illustrating the operation of the control apparatus for a multi-cylinder internal combustion engine according to Embodiment 1 of the present invention.
Figure 4:
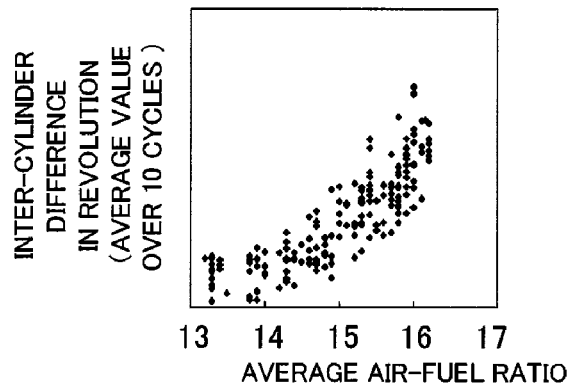
FIG. 4 is a graph illustrating the relationship between the average air-fuel ratio and the inter-cylinder difference in revolution in a case where all the cylinders have the same amount of fuel injection.

Embodiment 1 of a fuel-injection control using a control apparatus of the present invention will be described below with reference to FIG. 3.

The description to be given is based on the assumption that the characteristic differences among the fuel injection valves 7 cause the inter-cylinder differences in the amount of fuel injection as shown in FIG. 3A.

Once the engine is cold-started, the revolution of the engine becomes constant after a while as shown in FIG. 3B. Then, as shown in FIG. 3D, the average fuel injection amount of all the cylinders is corrected on the basis of the inter-cylinder differences in revolution. Each inter-cylinder difference in revolution is obtained by subtracting the revolution speed of the cylinder of the previous explosion from the revolution speed of the cylinder of the current explosion.

If a value of the inter-cylinder difference in revolution thus obtained exceeds a predetermined threshold value, a correction is executed so as to increase the amount of fuel injection for all the cylinders by a predetermined proportion. In contrast, if a value of the inter-cylinder difference in revolution obtained in the above-described manner is smaller than the predetermined threshold value, a correction is executed so as to decrease the amount of fuel injection for all the cylinders.

The above-mentioned threshold value is set so that the air-fuel ratio can be controlled around the theoretical air-fuel ratio that produces only a small amount of HC discharge (i.e., stoichiometric air-fuel ratio). This correction control will be referred to as the average-injection amount correction since the amounts of fuel injection for all the cylinders are controlled by the same correction proportion.

Here, if there are inter-cylinder differences in the amount of fuel injection as has been mentioned above, even an air-fuel ratio that is richer than the stoichiometric air-fuel ratio increases the inter-cylinder differences in revolution up to a value that exceeds the above-mentioned threshold value, resulting in an increase in the amount of fuel injection. Accordingly, as FIG. 3E shows, in a period immediately after the start of the engine, the air-fuel ratio is controlled at an air-fuel ratio λ1 that is richer than the stoichiometric air-fuel ratio.

In this embodiment, the amount of fuel injection after the start of the engine decreases from an increased level denoted by KAS (hereinafter, referred to as the post-engine-start increased fuel injection amount) down to a predetermined level denoted by KASL and then to a level that is lower than the level KASL as FIG. 3C shows. Once the amount of fuel injection has reached as low as the level KASL, the average values of the inter-cylinder differences in revolution over a predetermined cycles (the average values are calculated individually for the cylinders) are obtained, and then the amount of fuel injection for each cylinder is corrected on the basis of the obtained average value of the revolution differences for the cylinder, as FIG. 3F shows.

The average value of the revolution differences for each cylinder is obtained by averaging, over KCYC cycles, values of the inter-cylinder differences in revolution related to a single one of the cylinders. Accordingly, the cylinders have their respective average values calculated in this way. For example, suppose a case where the engine is a four-cylinder engine and the cylinders are ignited in the order of #1→#3→#4→#2 (#n represents the cylinder number). In this case, the average value of the revolution differences of the cylinder #3 is defined as a value obtained by averaging, over KCYC cycles, the difference obtained by subtracting the revolution speed at the explosion of the cylinder #1 from the revolution speed at the explosion of the cylinder #3. Note that the number of cycles (KCYC) is set at, for example, thirty.

The average value of the revolution differences of each of the cylinders is equal to the average value of the differences between the friction torques and each of the torques generated by the cylinder in question. With almost constant idling revolutions, the friction torque is substantially equal to the average value of the torques generated by all the cylinders. Accordingly, the average value of the revolution differences of each of the cylinders is equal to the average value of the differences between the average value of the torques generated by all the cylinders and the torques generated by the cylinder in question.

For this reason, if the average torque of one of the cylinders is larger than the average torque of all the cylinders, the average value of the revolution differences of the cylinder in question is positive after the post-engine-start increased fuel injection amount KAS is reduced down as low as the KASL level. The cylinders #1 and #4 in FIG. 3F are examples of this case.

The control that is executed here is reducing the amount of fuel injection of the cylinder in question by a predetermined amount, as shown by the cylinders #1 and #4 in FIG. 3G, so as to make the average value of the revolution differences of the cylinder in question converge to zero. Accordingly, the average torque of the cylinder in question is reduced and the difference between the average torque of the cylinder in question and the average torque of all the cylinders is also reduced.

In contrast, if the average torque of one of the cylinders is smaller than the average torque of all the cylinders, the average value of the revolution differences of the cylinder in question is negative after the post-start increased fuel injection is reduced down as low as the KASL level. The cylinders #3 and #2 in FIG. 3F are examples of this case.

The control that is executed here is increasing the amount of fuel injection of the cylinder in question by a predetermined amount, as shown by the cylinders #3 and #2 in FIG. 3G, so as to make the average value of the revolution differences of the cylinder in question converge to zero. Accordingly, the average torque of the cylinder in question is increased and the difference between the average torque of the cylinder in question and the average torque of all the cylinders is also reduced. Similar control is repeatedly executed from then on for every KCYC cycles. Accordingly, the control is executed so that the average torque of each of the cylinders can be equal to the average torque of all the cylinders, that is, so that all the cylinders have the same average torque. The correction will be referred to as the inter-cylinder injection amount correction.

As has been described above, the average torques of the cylinders can be equalized by controlling the amount of fuel injection of each of the cylinders so as to make the average value of the revolution differences of each of the cylinders close to zero. Accordingly, as has been described above, the average air-fuel ratio and the inter-cylinder differences in revolution becomes better correlated with each other. Thus, when the average-injection amount correction is executed on the basis of the inter-cylinder differences in revolution, the proper frequency of fuel amount increase can be accomplished, and thereby the air-fuel ratio converges to an air-fuel ratio $\lambda 2$ that is close to the stoichiometric air-fuel ratio. Accordingly, even if the differences in fuel injection amount of each of the cylinders cause differences in average torque of each of the cylinders, the discharge of the unburned gas can be reduced.

In addition, among the factors that bring about the differences in the average torque of each of the cylinders, the inter-cylinder differences in fuel injection amount brought about by the characteristic differences among the fuel injection valves 7 have a large influence on the differences in average torque of each of the cylinders. When the above-described control is executed so that the cylinders can have the same average torque, the amount of fuel injection of each of the cylinders is corrected so as to reduce the differences in fuel injection amount of each of the cylinders. Accordingly, an increase in the discharge amount of the unburned gas can be suppressed, the increase being caused by the production of a rich air-fuel ratio of some of the cylinders.

Note that the correction of the amount of fuel injection of each of the cylinders on the basis of the average value of the inter-cylinder differences in revolution is started only after the post-engine-start increased fuel injection amount KAS is lowered down to as low as the predetermined value KASL or below that. The correction-start timing is determined as such for the following reason.

The differences in average torque of each of the cylinders can be reduced by correcting the amount of fuel injection on the basis of the average value of the inter-cylinder differences in revolution. Such a reduction, however, can be accomplished only if the following requirement is satisfied. The engine has torque characteristics such that the torque increases as the amount of fuel injection increases while the torque decreases as the amount of fuel injection decreases. To put it differently, as the air-fuel ratio becomes leaner, the torque decreases monotonically.

Figure 7:
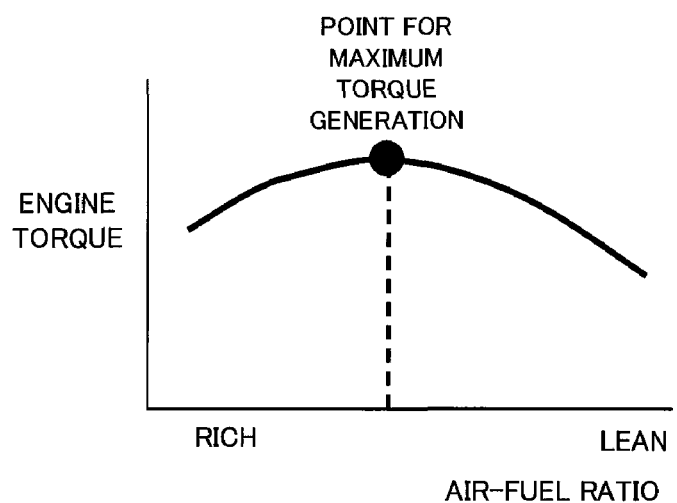
FIG. 7 is a graph illustrating the relationship between the air-fuel ratio and the torque.

On the other hand, in the period immediately after the cold start of the engine, the temperature of the intake valves and of the inner walls of the combustion chamber is still low, so that the fuel deposited on the valve surfaces and on the wall surfaces is more difficult to evaporate. For this reason, it is a common practice that the post-engine-start increased fuel injection amount is made large enough to fit the use of heavy gasoline. Accordingly, if either standard or light gasoline is used, the air-fuel ratio immediately after the engine start becomes rich. The torque-generation characteristics of the engine relative to the air-fuel ratio shown in FIG. 7 sometimes make the air-fuel ratio at the operation point richer than the air-fuel ratio that generates the maximum torque (specifically, the air-fuel ratio being 12.5 to 13 in general). Accordingly, in this range of the air-fuel ratio, as the amount of fuel injection decreases (the leaner the air-fuel ratio is), a larger torque can be generated.

Suppose that a correction of the amount of fuel injection is executed in this period on the basis of the average value of the revolution differences of each of the cylinders. Then, the torque generated by a cylinder with a large average torque is increased further by the decrease in the amount of fuel injection for the cylinder. In the meanwhile, the torque generated by a cylinder with a small average torque is decreased further by the increase in the amount of fuel injection for the cylinder. The correction executed as above is an erroneous correction that makes the inter-cylinder differences in torque larger than the differences before the correction. Accordingly, the equalization of the average torques of the cylinders cannot be accomplished. In addition, with this correction that results in larger inter-cylinder differences in the amount of fuel injection, a correction to increase the amount of fuel injection is executed on a cylinder that has been supplied with a larger amount of fuel injection, so that the air-fuel ratio to be supplied to the cylinder becomes even richer, resulting in an increase in the discharge amount of the unburned gas.

Accordingly, when the amount of fuel injection is corrected on the basis of the average value of the revolution differences of each of the cylinders, it is necessary to calculate the correction value of the amount of fuel injection for each of the cylinders while the air-fuel ratio is within a range where a decrease in the amount of fuel injection (a leaner air-fuel ratio) decreases the torque, that is, within a range where the air-fuel ratio is leaner than the air-fuel ratio for the maximum torque.

Figure 8:
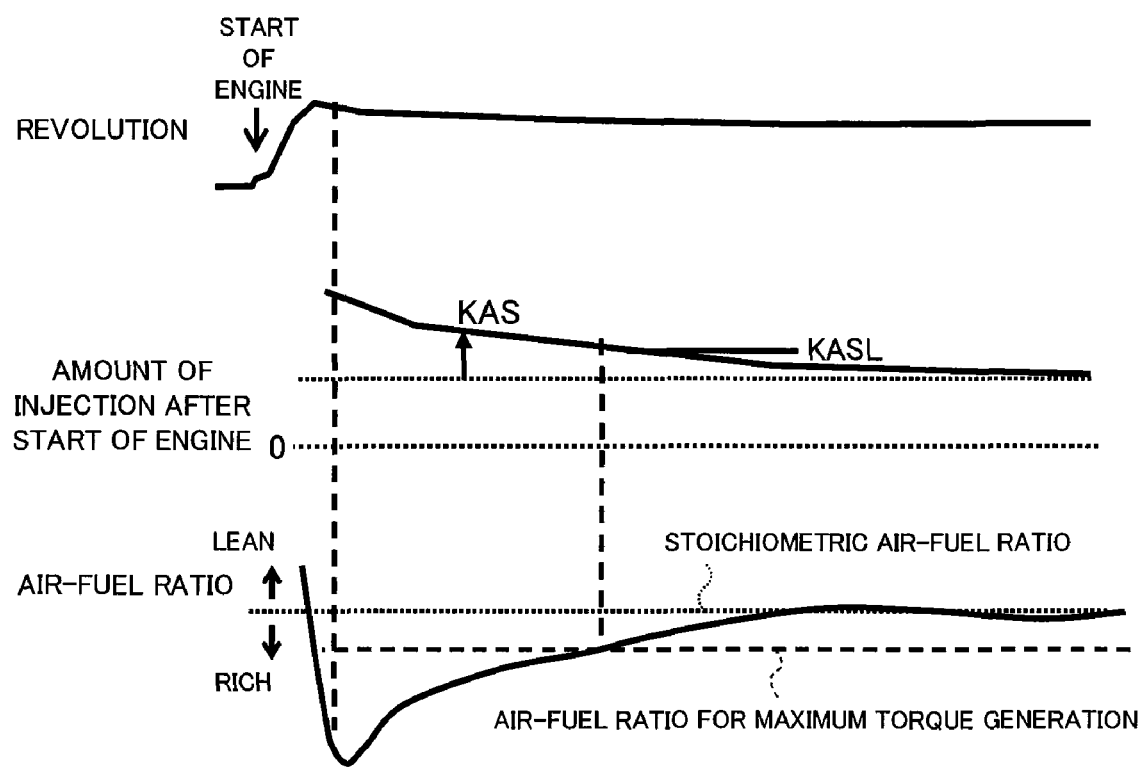
FIG. 8 is a time chart illustrating the timing to execute the inter-cylinder correction of the amount of fuel injection.

Accordingly, for the purpose of calculating the correction value of the amount of fuel injection for each of the cylinders at an air-fuel ratio that is leaner than the air-fuel ratio for the maximum torque in this embodiment, the calculation of the correction value of the amount of fuel injection for each of the cylinders on the basis of the average value of the revolution differences is started only after the post-engine-start increased fuel injection amount KAS indicated by the arrow in FIG. 8 is reduced down to the predetermined value KASL or lower as FIG. 8 shows.

Note that the post-engine-start increased fuel injection amount KAS is set, commonly, in association with the length of time that has elapsed since the start of the engine. Accordingly, in an alternative configuration, a means for measuring the length of time that has passed since the start of the engine may be provided, and the length of time needed for accomplishing the air-fuel ratio to generate the maximum torque may be determined in advance. Then, the calculation of the correction value of the amount of fuel injection for each of the cylinders on the basis of the average value of the revolution differences may be started only after the predetermined length of time has passed.

The control routine of the control apparatus according to this embodiment (Embodiment 1) will be described below with reference to the flowchart shown in FIG. 9. The programmed processing for this control routine is stored in the memory 42 of the controller 40, and executed by the CPU 41.

Since this control routine is executed during idling of the engine after the start of the engine, the control routine begins with a determination as to whether the engine has already been started or not (Step 100). In this engine-start determination, it is determined that the engine has already been started on condition that the engine speed has been increased and then has become stable.

If it is determined that the engine has already been started, the inter-cylinder difference in revolution DN is calculated (Step 105). The inter-cylinder difference in revolution DN is calculated in the following way. To begin with, on the basis of the signals sent from the crank-angle sensor 18, the length of time $T_n$ needed for the displacement of the crankshaft after the ignition by a predetermined crank angle θ is measured for each of the cylinders, and thus the revolution speed NE is calculated by use of Formula 1. Note that $T_n$ denotes the displacement time of the cylinder of the current explosion, and $NE_n$ denotes the revolution speed of the cylinder of the current explosion.

$$NE_n = 60 \cdot \theta / 360 \cdot T_n \tag{Formula 1}$$

Next, on the basis of revolution speed $NE_n$ of the cylinder of the current explosion, the inter-cylinder difference in revolution (the difference in the revolution speed between the cylinder of the current explosion and the cylinder of the previous explosion) $DN_n$ is calculated by use of Formula 2. Note that $NE_{n-1}$ denotes the revolution speed of the cylinder of the previous explosion.

$$DN_n = NE_n - (NE_{n-1}) \tag{Formula 2}$$

The calculation of the inter-cylinder difference in revolution $DN_n$ is executed for every cycle of explosion of each of the cylinders.

Note that the calculation of the inter-cylinder difference in revolution $DN_n$ may be done not by calculating the revolution speed but by use of the length of time $T_n$ needed for the displacement by the crank angle θ. This simple way of calculating the inter-cylinder differences in revolution $DN_n$ can be carried out by use of Formula 3.

$$DN_n = T_n - (T_{n-1}) \tag{Formula 3}$$

Note that if it is determined, at Step 100, that the engine has not been started yet, neither the calculation of the inter-cylinder difference in revolution $DN_n$ nor the correction of the amount of fuel injection, which will be described below, will be executed.

Next, a determination is made as to whether the pre-requisites for the calculation of the coefficients of the inter-cylinder correction of fuel injection amount on the basis of the average value of the revolution differences of each of the cylinders are satisfied or not (Step 110). If the pre-requisites are satisfied, the coefficient of the inter-cylinder correction of fuel injection amount $KCYL_m$ for each cylinder is calculated on the basis of the average value of the revolution differences of each of the cylinders (Step 120). Note that m represents the cylinder number.

If the pre-requisites for the calculation of the coefficients of the inter-cylinder correction of fuel injection amount are not satisfied, a value of 1 is given to the coefficient of the inter-cylinder correction of fuel injection amount $KCYL_m$ (Step 130), and no inter-cylinder correction of fuel injection amount will be executed.

Next, a determination is made as to whether the pre-requisites for executing the correction of average fuel injection amount on the basis of the inter-cylinder differences in revolution are satisfied or not (Step 140). If the pre-requisites for executing the correction of average fuel injection amount are satisfied, the coefficient of the correction of average fuel injection amount KTRM will be calculated (Step 150). Conversely, if the pre-requisites for executing the correction of average fuel injection amount are not satisfied, a value of 1 is given to the coefficient KTRM (Step 160), and the correction of average fuel injection amount will not be executed.

Next, the injection pulse width $TI_m$ of each cylinder is calculated (Step 170). The injection pulse width $TI_m$ of each cylinder is calculated by correcting the basic fuel injection amount TP that is calculated by use of the engine speed and either the intake-air volume or the intake-air pressure. According to Formula 4, the coefficients used for the purpose of executing the correction are: a correction coefficient KTW that is determined on the basis of the temperature of the cooling water for the engine; a coefficient KAS of the post-engine-start increased fuel injection amount; a coefficient KTRM of the correction of average fuel injection amount; and a coefficient $KCYL_m$ of the inter-cylinder correction of fuel injection amount.

$$Tim \leftarrow TP(1+KTW+KAS+\ldots)KTRM \cdot KCYL_m \quad \text{(Formula 4)}$$

Note that, while the coefficient $KCYL_m$ of the inter-cylinder correction of fuel injection amount is used to correct the injection pulse width for each of the cylinders, the coefficient KTRM of the correction of average fuel injection amount is used to correct the average amount of fuel injection by executing the correction of the injection pulse widths of all the cylinders by the same proportion.

Next, a specific example of the determination as to the pre-requisite for calculating the coefficient of the inter-cylinder correction of fuel injection at Step 110 in FIG. 9 will be described with reference to the flowchart shown in FIG. 10.

Among the factors that bring about the inter-cylinder differences in average torque, the inter-cylinder differences in fuel injection amount is influential. The amount of the inter-cylinder differences in average torque differs depending upon the concentration of the air-fuel mixture around the spark plug. Therefore, the amount of fuel deposited on the intake port and on the walls of the cylinder has an influence on the amount of the inter-cylinder differences in average torque. Accordingly, the inter-cylinder correction of fuel injection amount is preferably executed on condition that the temperature of the engine (for example, the temperature of the engine-cooling water) is within same range as the temperature at which the correction of average fuel injection amount is executed.

For this reason, the first thing to be performed is a determination as to whether the temperature of the engine is or is not within a predetermined range TCL to TCH (Step 210). Note that the correction of average fuel injection amount is executed when the temperature of the engine is one at which the air-fuel ratio variation is caused by the difference in the fuel characteristics. Specifically, the engine temperature is within a range, for example, from −10° C. to 35° C., which corresponds to the temperature of a cold engine. Accordingly, the temperature range TCL to TCH set for executing the inter-cylinder correction of fuel injection amount is preferably also within the above-mentioned range.

If the temperature of the engine is within the predetermined range TCL to TCH, a determination will be made as to whether the engine is or is not idling (whether the accelerator pedal is or is not depressed on) (Step 220). If the engine is idling, a determination will be made as to whether the post-engine-start increased fuel injection amount KAS is reduced down to as low as the predetermined level KASL (Step 230). The reason for this determination is that, as described above, it is necessary for the air-fuel ratio operation point to be leaner than the air-fuel ratio for the maximum torque for the purpose of calculating, correctly, the coefficient of the inter-cylinder correction of fuel injection amount on the basis of the average value of the inter-cylinder differences in revolution.

Note that, as described above, for the purpose of preventing the air-fuel ratio from becoming excessively high when heavy gasoline is used, the post-engine-start increased fuel injection amount KAS is commonly set at a larger amount immediately after the start of the engine. Accordingly, the calculation of the coefficient of the inter-cylinder correction of fuel injection amount on the basis of the average value of the inter-cylinder differences in revolution will not be performed here (i.e., it is assumed that the pre-requisites for calculating the coefficient of the inter-cylinder correction of fuel injection amount are not satisfied here). As a consequence, only the correction of average fuel injection amount, which will be described in detail later, will be executed here.

In addition, note that, as described above, the post-engine-start increased fuel injection amount KAS is most probably set in association with the length of time that has passed since the start of the engine. Accordingly, the length of time which has passed since the start of engine till the air-fuel ratio becomes leaner than the air-fuel ratio for the maximum torque is set, beforehand, as a determination value KASL, and then once the length of time that has passed since the start of the engine exceeds the value KASL, it is determined that the pre-requisites for calculating the coefficient of the inter-cylinder correction of fuel injection amount are satisfied (Step 240).

If any one of the conditions listed in the series of determinations from Step 210 to Step 230 is not satisfied, it is determined that the pre-requisites for calculating the coefficient of the inter-cylinder correction of fuel injection amount are not satisfied (Step 250).

Figure 11:
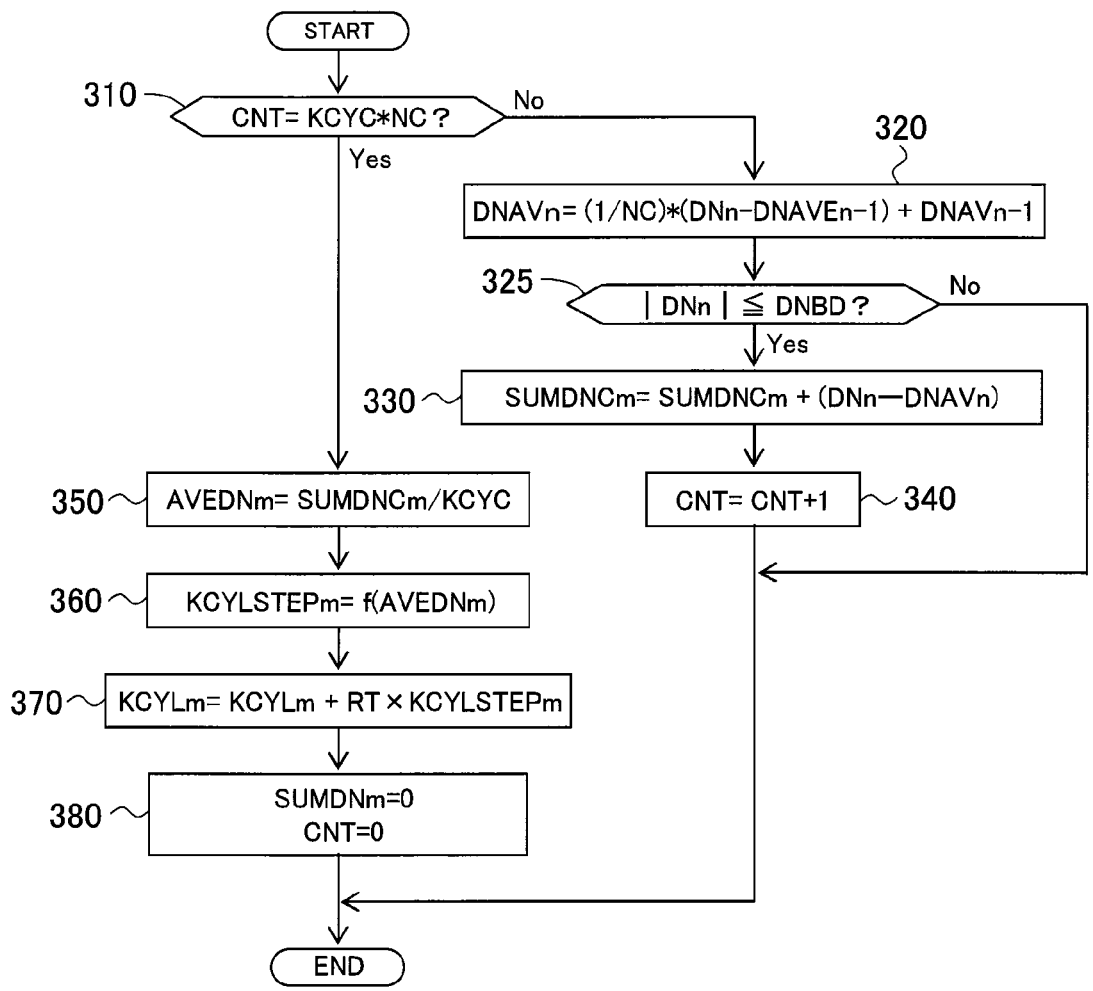
FIG. 11 is another control flowchart of the inter-cylinder correction of the amount of fuel injection of Embodiment 1.

What will be described next is the routine for calculating the coefficient $KCYL_m$ of the inter-cylinder correction of fuel injection amount at Step 120 in FIG. 9. The calculation is executed when it is determined that the pre-requisites for calculating the coefficient of the inter-cylinder correction of fuel injection are satisfied. The description will be given with reference to the flowchart shown in FIG. 11.

When the inter-cylinder correction of fuel injection amount is executed, the average value of the inter-cylinder differences in revolution (average value of the revolution differences) over predetermined cycles is calculated, and then the amount of fuel injection for each of the cylinders is corrected on the basis of the average value of the revolution differences.

To begin with, for the purpose of calculating the average value of the revolution differences, a determination is made as to whether the cumulated number CNT of the above-described inter-cylinder differences in revolution has reached a predetermined number (specifically, KCYC×NC times) or not (Step 310). Note that KCYC represents the number of cycles over which the averaging is executed, and NC represents the number of cylinders. The number of cycles KCYC is set, for example, at 30 so that the inter-cylinder differences in average torque can be detected.

If the cumulated number CNT has not reached the number obtained by KCYC×NC, the average value $DNAV_n$, over a single cycle, of the inter-cylinder differences in revolution $DN_n$ will be calculated by use of Formula 5 (Step 320).

$$DNAV_n = (DN_n + (DN_{n-1}) + \ldots + DN_n - (NC+1))/NC \quad \text{(Formula 5)}$$

After the calculation of the average value $DNAV_n$, a determination is made as to whether the absolute value of the inter-cylinder difference in revolution $DN_n$ is or is not within a predetermined range DNBD (Step 325). If the absolute value of the inter-cylinder difference in revolution $DN_n$ is within the predetermined range DNBD, the difference obtained by subtracting $DNAV_n$ from $DN_n$ will be summed up for each of the cylinders (Step 330).

Note that the difference $DN_n - DNAV_n$ corresponds to the difference between the average torque over a single cycle and the torque of the cylinder of the current explosion. In addition, while m represents the cylinder number, and assuming that which one of the cylinders each of the inter-cylinder differences in revolution $DN_n$ corresponds to has been determined in advance, the value $DN_n - DNAV_n$ is summed up in cumulative memory $SUMDNC_m$ of the corresponding cylinder.

After the summing up, the cumulated number CNT is incremented by one (Step 340).

If, at Step 325, the absolute value of the inter-cylinder differences in revolution $DN_n$ exceeds the predetermined range DNBD, the summation will not be executed for the following reason. Suppose a case where the combustion state of one of the cylinders is extremely poor, or where misfiring occurs. In this case, the difference in torque between the cylinder of poor combustion and the cylinder of normal combustion would be increased, and the increase would cause an increase, in the positive direction, in the average value of the revolution differences for the cylinder of normal combustion. Then, the amount of fuel injection for the normal-combustion cylinder would be erroneously reduced. With the above-mentioned cancelling of the summation, the erroneous reduction of the fuel injection of the normal-combustion cylinder can be avoided.

If, at Step 310, the cumulated number CNT has reached the number obtained by KCYC×NC, the summing up of the difference $DN_n$–$DNAV_n$ has already been executed KCYC times for each of the cylinders. Accordingly, the average value of the revolution differences $AVEDN_m$ for the cylinder #m will be calculated by dividing the value of the cumulative memory $SUMDNC_m$ of the cylinder by the number of cycles KCYC (Step 350).

Next, the adjustment amount $KCYLSTEP_m$ of the coefficient $KCYL_m$ of the inter-cylinder correction of fuel injection amount for each of the cylinders is calculated on the basis of the average value ($AVEDN_m$) of the revolution differences of the cylinder #m (Step 360). Note that the coefficient $KCYL_m$ of the inter-cylinder correction of fuel injection amount is updated every KCYC cycles, and the adjustment amount $KCYLSTEP_m$ is defined as the adjustment amount for each update.

Figure 12:
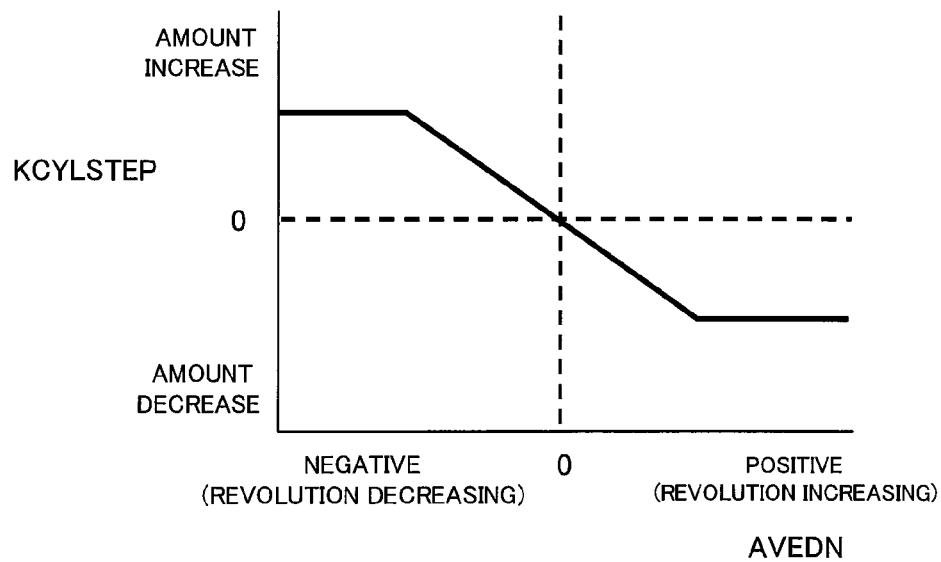
FIG. 12 is a graph illustrating the setting of the adjustment value for the amount of fuel injection relative to the average value for the inter-cylinder differences in revolution of Embodiment 1.

The adjustment amount KCYLSTEP has been set beforehand in association with the average value of the revolution differences AVEDN for the cylinder #m by a function illustrated in FIG. 12. If the average value $AVEDN_m$ of the revolution differences of the cylinder #m is negative, (i.e., located on the revolution-decreasing side in FIG. 12), the adjustment amount $KCYLSTEP_m$ for the cylinder #m will be set so as to increase the fuel injection amount. Conversely, if the average value $AVEDN_m$ of the revolution differences for the cylinder #m is positive (i.e., located on the revolution-increasing side), the adjustment amount $KCYLSTEP_m$ for the cylinder #m will be set so as to decrease the fuel injection amount.

The adjustment amount KCYLSTEP is set by obtaining—beforehand through an experiment—the correction value for the amount of fuel injection so that, when there are revolution differences with their average value of AVEDN, the differences in revolution can be substantially zero.

Next, the coefficient $KCYL_m$ of the inter-cylinder correction of fuel injection amount for each of the cylinders is calculated by use of Formula 6 (Step 370).

$$KCYL_m = KCYL_m \text{ (the value obtained by the previous calculation)} + RT \times KCYLSTEP_m \quad \text{(Formula 6)}$$

In Formula 6, RT represents a correction gain.

When the coefficient $KCYL_m$ of the inter-cylinder correction of fuel injection amount is adjusted with the adjustment amount $KCYLSTEP_m$ by use of the Formula 6, the amount of fuel injection of the cylinder with a negative average value AVEDN of the revolution differences (i.e., the cylinder with a torque that is smaller than the average torque of all the cylinders) is increased. Accordingly, this cylinder is controlled so as to generate a larger torque. In contrast, the cylinder with a positive average value AVEDN of the revolution differences (i.e., the cylinder with a torque that is larger than the average torque of all the cylinders) is reduced. Accordingly, this cylinder is controlled so as to generate a smaller torque.

Similar processes will be executed in the following KCYC cycles. Accordingly, both the cumulative memories $SUMDNC_m$ and the cumulated number CNT are initialized (Step 380).

By repeating these processes every KCYC cycles, the amounts of fuel injection for the cylinders are controlled so that the average value of the revolution differences of each of the cylinders can be zero (the average torque of each of the cylinders can be the same).

Figure 13:
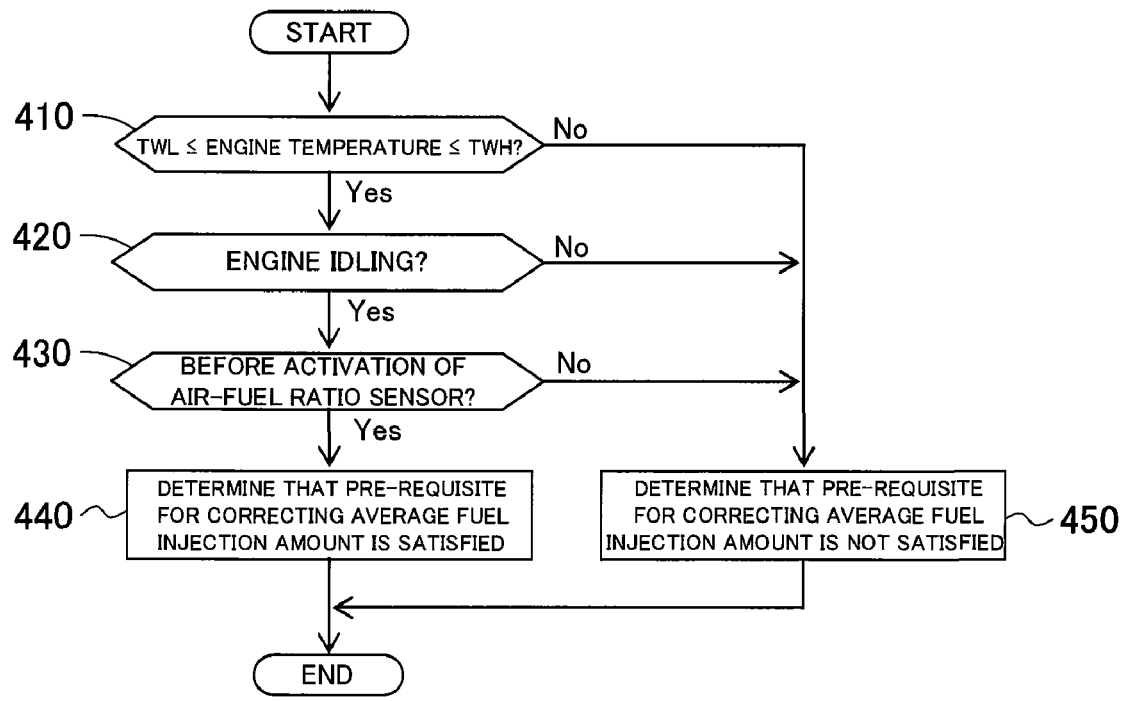
FIG. 13 is a control flowchart of the correction of the average amount of fuel injection of Embodiment 1.

Next, a description will be given as to a control routine of the correction of average fuel injection amount to control the fuel injection amount so that the air-fuel ratio after the start of the engine can be within a range of air-fuel ratio suitable for the reduction of HC discharge irrespective of the differences in the fuel properties (volatility) and of the characteristic differences of the components of the fuel-supply system. Specifically, the determination at Step 140 in FIG. 9 as to the pre-requisite for the correction of average fuel injection amount will be described with reference to the flowchart shown in FIG. 13.

Note that the correction of average fuel injection amount must be executed while the engine is in a cold state in which the volatility of the fuel is still low and an increase in the fuel injection amount is necessary. Accordingly, a determination is made as to whether the temperature of the engine (for example, the temperature of the cooling water) is or is not within a predetermined range from TWL to TWH (Step 410).

If the temperature of the engine is within the above-mentioned range, a determination will be made as to whether the engine is or is not idling, which is a state where the acceleration pedal is not depressed on (Step 420). If the engine is idling, a determination will be made as to whether the air-fuel ratio sensor 26 is inactive or not (Step 430). If the air-fuel ratio sensor 26 has not been activated yet, it is determined that the pre-requisite for the correction of the average fuel injection amount is satisfied (Step 440).

If any one of the conditions listed in Step 410 to Step 430 is not satisfied, it is determined that the pre-requisite for the correction of the average fuel injection amount is not satisfied (Step 450).

Figure 14:
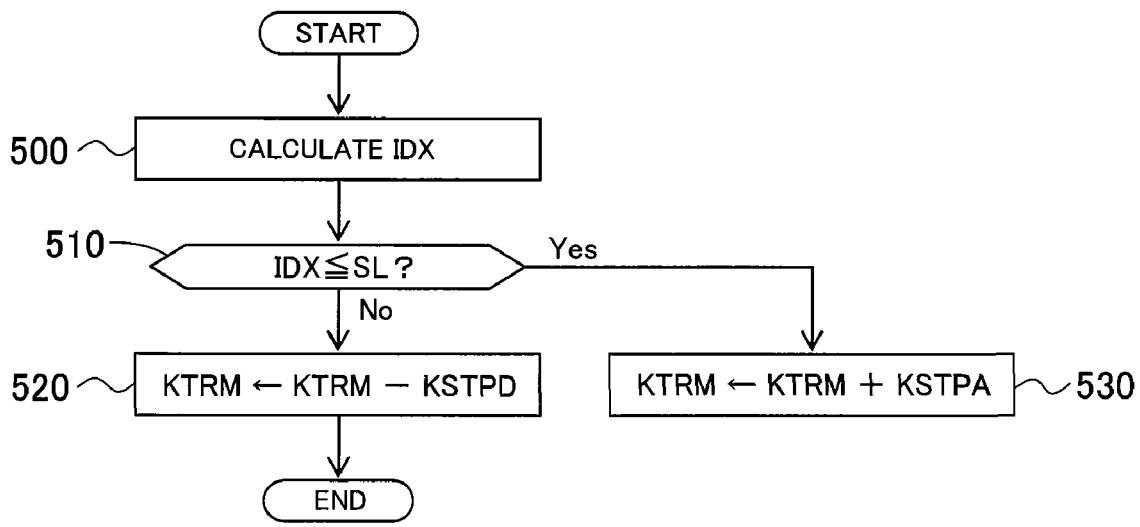
FIG. 14 is another control flowchart of the correction of the average amount of fuel injection of Embodiment 1.

Next, a description will be given as to the routine for the calculation at Step 150 in FIG. 9 executed for calculating the correction coefficient KTRM of the correction of average fuel injection amount. The description will be given with reference to the flowchart shown in FIG. 14.

To begin with, an index IDX for estimating the air-fuel ratio is calculated (Step 500). Here, the above-described inter-cylinder differences in revolution $DN_n$ are used as the indices IDX for the estimating the air-fuel ratio.

Next, each index IDX is compared with a predetermined threshold value SL (Step 510). The index IDX is negative when the revolution slows down. So, the threshold value SL is set at a negative value so as to detect the slowing down of the revolution.

If the index IDX is not as high as the threshold value SL (i.e., when the revolution slows down), it is determined that the air-fuel ratio is lean. Accordingly, the correction coefficient KTRM for the correction of average fuel injection amount is increased by a predetermined amount KSTPA (Step 530). With this increase, the air-fuel ratio is prevented from being excessively lean, so that the worsening of the drivability caused by the over-lean air-fuel ratio can be avoided.

If the index IDX is higher than the threshold value SL (i.e., when the revolution does not slow down) it is determined that the air-fuel ratio is rich. Accordingly, the correction coefficient KTRM for the correction of average fuel injection is decreased by a predetermined amount KSTPD (Step 520).

The purpose of the use of this smaller correction coefficient is to minimize the discharge amount of the unburned gas (HC), which is accomplished by reducing the amount of fuel injection while the average air-fuel ratio is rich.

Figure 9:
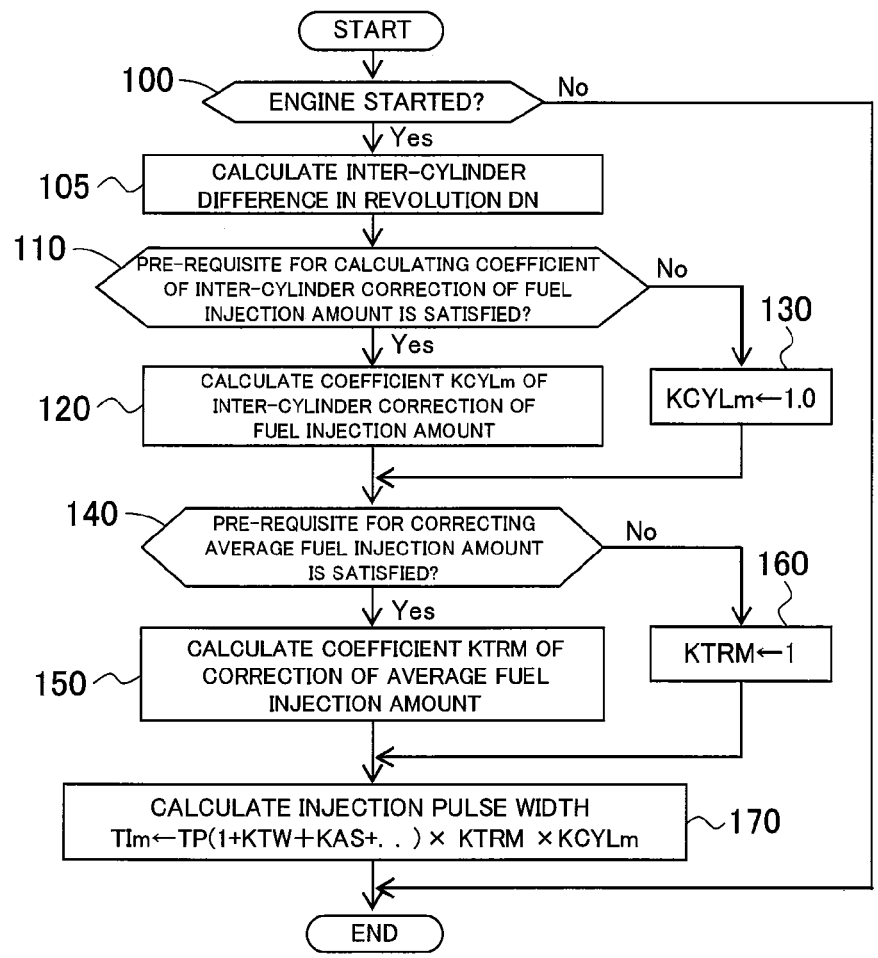
FIG. 9 is a control flowchart of the control apparatus of Embodiment 1.
Figure 10:
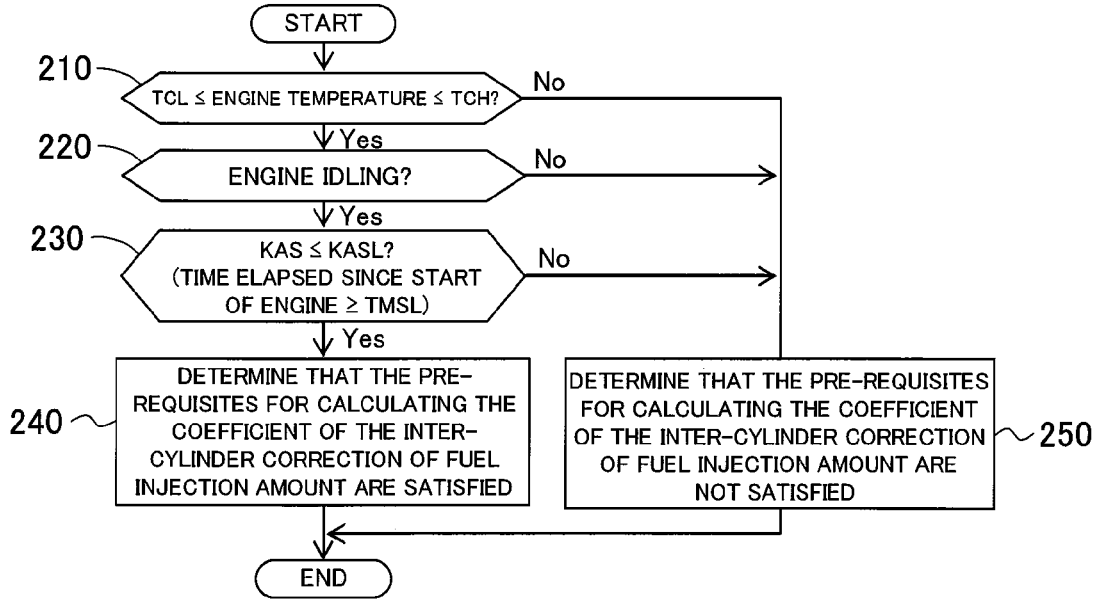
FIG. 10 is a control flowchart of the inter-cylinder correction of the amount of fuel injection of Embodiment 1.

By calculating the correction coefficient KTRM for the correction of average fuel injection amount every single explosion in the above-described manner, the injection pulse width is corrected by use of the correction coefficient KTRM of the correction of average fuel injection amount as described in Step 170 of FIG. 9. Accordingly, the air-fuel ratio after the start of the engine can be controlled at a ratio around the stoichiometric air-fuel ratio that is suitable for the HC reduction.

Note that, even when the air-fuel ratio is constant, the index IDX (inter-cylinder difference in revolution) fluctuates every single explosion. However, by giving a small value to each of the adjustment amounts KSTPA and KSTPD for each correction, the air-fuel ratio can be stably controlled at a ratio around the stoichiometric air-fuel ratio.

Note that, for the purpose of improving the accuracy with which the air-fuel ratio is estimated in Step 500, an index obtained by averaging (moderating processing) the inter-cylinder differences in revolution $DN_n$ over a predetermined number of cycles may be used as the index IDX.

The number of cycles used in the execution of the averaging of the inter-cylinder differences in revolution $DN_n$ is set within a range from 1 to 10 cycles. With the setting of such a range of cycles, worsening of the response in the control can be avoided when the air-fuel ratio is changed to be leaner.

In addition, the index IDX may be calculated by use of Formula 7. The use of Formula 7 helps to prevent the worsening of the accuracy of the estimation for the air-fuel ratio, which would be caused by the fluctuation in the inter-cylinder differences in revolution due to the changing of driving state. Note that $NE_{n-2}$ in Formula 7 represents the revolution speed of the last but one explosion.

$$IDX=-\{(NE_n-(NE_{n-1}))-((NE_{n-1})-(NE_{n-2}))\} \quad \text{(Formula 7)}$$

When there are changes in the driving state, the revolution either increases or decrease over several consecutive explosions more often than not. The influence that the changes in the driving state have on the inter-cylinder differences in revolution may probably affect the revolution difference $NE_n-(NE_{n-1})$ and the revolution difference $NE_{n-1}-(NE_{n-2})$ in Formula 7. Accordingly, by calculating the difference between the above-mentioned two revolution differences, the part of the influence caused by the changes in the driving state can be reduced.

As described above, after the post-engine-start increased fuel injection amount KAS is reduced down to as low as the level KASL, the inter-cylinder correction of fuel injection is executed. Accordingly, even when factors other than the combustion state cause the inter-cylinder differences in revolution (inter-cylinder differences in torque), a strong correlation between the air-fuel ratio and the inter-cylinder differences in revolution can be secured. As a consequence, when the correction of average fuel injection amount is executed, the inter-cylinder differences can be prevented from making the air-fuel ratio richer, and the HC discharge amount can be minimized.

In Embodiment 1, the controlling of the fuel injection amount for each of the cylinders is the means for equalizing the average torques of the cylinders. To achieve the same end, another means may be used alternatively. For example, suppose that the engine is equipped with such another torque controlling means as an adjustment system capable of adjusting the action timing and the lifting amount of the intake and the exhaust valves for each of the cylinders independently. In this case, all the cylinders can have the same average torque by adjusting the air volume for each of the cylinders through the adjustment of the valve-action timing and of the valve-lifting amount for each of the cylinders independently. In addition, when the engine is equipped with throttle valves capable of adjusting the intake-air volume to be supplied to their respective cylinders, the equalization of the average torques may be accomplished by adjusting the throttle-valve angles for their respective cylinders.

As described above, in the inter-cylinder correction of fuel injection amount, the coefficient of the inter-cylinder correction of fuel injection amount for each of the cylinders must be calculated while the air-fuel ratio is leaner than the air-fuel ratio for the maximum torque. Accordingly, while the air-fuel ratio is still richer than the air-fuel ratio for the maximum torque, that is, immediately after the start of engine, the coefficient of the inter-cylinder correction of fuel injection amount for each of the cylinders cannot be calculated.

For this reason, in a case where factors other than the combustion state cause inter-cylinder differences in torque, executing the correction of average fuel injection amount on the basis of the inter-cylinder differences in revolution immediately after the start of the engine sometimes fails to equalize the average torques of the cylinders, resulting in the production of a richer air-fuel ratio.

In view of the above-mentioned problem, an alternative configuration is provided, as Embodiment 2, to reduce the inter-cylinder differences in torque immediately after the start of the engine. In the configuration provided in Embodiment 2, the coefficient of the inter-cylinder correction of fuel injection amount is not calculated until the air-fuel ratio after the start of the engine becomes leaner than the air-fuel ratio for the maximum torque generation, which is the same as in the case of the above-described embodiment. The calculated coefficient of the inter-cylinder correction of fuel injection is, however, stored in a backup memory (a memory that keeps the data even when the engine is not in operation), and, at the start of the engine for the next time onwards, the amount of fuel injection of each of the cylinders is corrected by use of the coefficient of the inter-cylinder correction of fuel injection amount stored in the backup memory. Thus, the inter-cylinder differences in torque can be reduced from the time immediately after the start of the engine. As a consequence, the air-fuel ratio is prevented from being rich.

Figure 15:
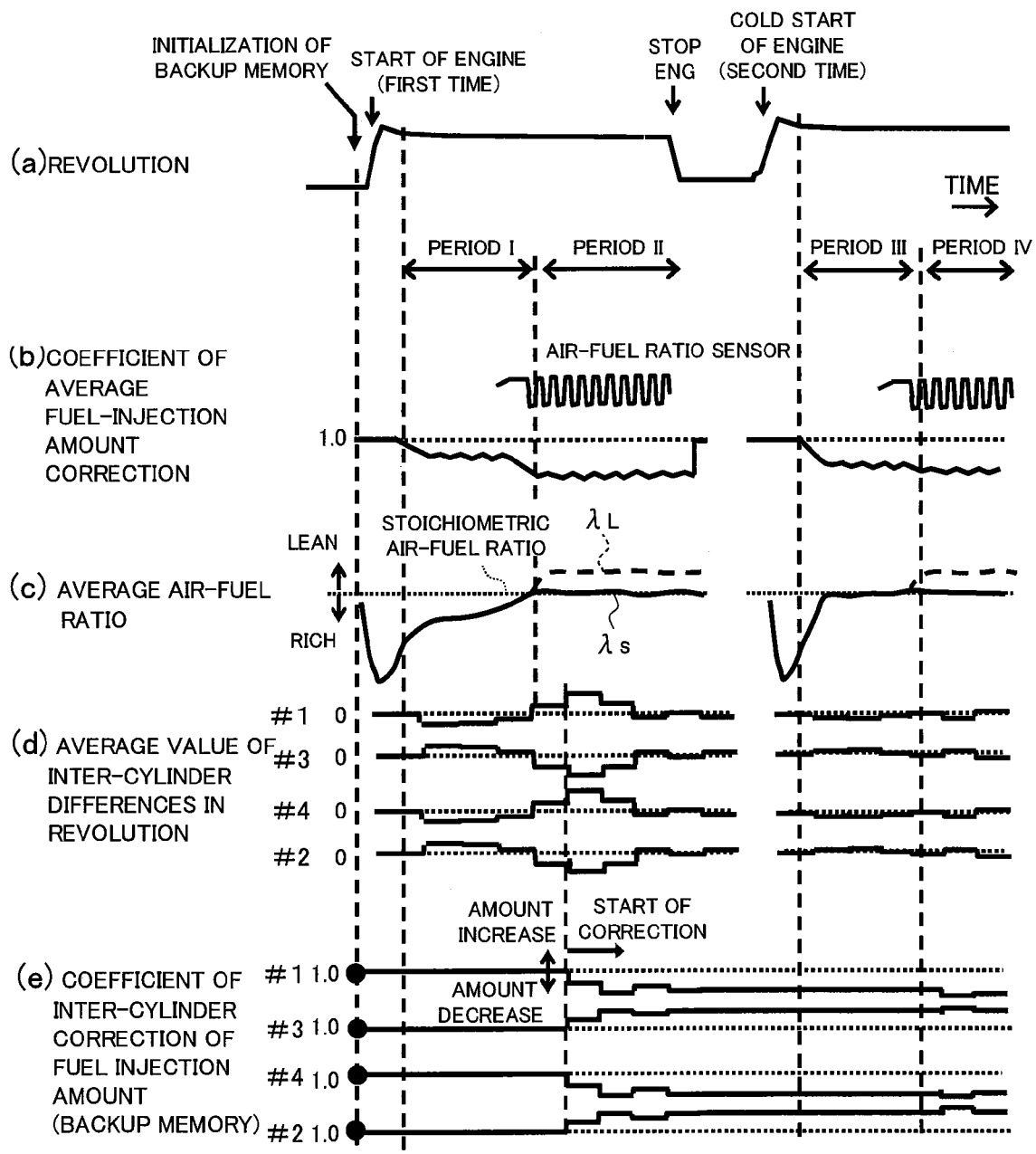
FIG. 15 is a time chart illustrating the operation of the control apparatus for a multi-cylinder internal combustion engine according to Embodiment 2 of the present invention.

A fuel-injection control executed by a control apparatus of Embodiment 2 will be described below with reference to FIG. 15.

Now, suppose a case where the backup memory has been initialized (for example, suppose a state where the data that was stored in the backup memory has been erased by removing the battery) as shown in FIG. 15A. When the engine in this state starts for the first time since the initialization, the calculation of the coefficient of the inter-cylinder correction of fuel injection amount is not executed until the air-fuel ratio becomes leaner than the air-fuel ratio for the maximum torque generation.

In this embodiment, as indicated by the solid lines in FIGS. 15B and 15C, after the air-fuel ratio sensor 26 is activated, a feedback control of the average amount of fuel injection is executed by use of the activated air-fuel ratio sensor 26 so as to make the air-fuel ratio be at a ratio around the stoichiometric air-fuel ratio (theoretical air-fuel ratio) λs. While the feedback control is being executed (such a period is referred to as Period II in FIG. 15A), the coefficient of the inter-cylinder correction of fuel injection amount is calculated.

At the stoichiometric air-fuel ratio, which is most probably leaner than the air-fuel ratio for the maximum torque generation, the coefficient of the inter-cylinder correction of fuel injection amount can be calculated. In addition, the air-fuel ratio is controlled stably by use of the air-fuel ratio sensor 26, so that the coefficient of the inter-cylinder correction of fuel injection amount can be calculated with high accuracy.

Note that the calculation of the coefficient of the inter-cylinder correction of fuel injection amount is not executed until the activation of the air-fuel ratio sensor 26. During this period without the calculation of the coefficient of the inter-cylinder correction of fuel injection amount, only the correction of the average air-fuel ratio is executed on the basis of the inter-cylinder differences in revolution.

The correction of average fuel injection of FIG. 15B is executed in the following way. Before the activation of the air-fuel ratio sensor 26, the correction of the average amount of fuel injection is executed on the basis of the inter-cylinder differences in revolution. After the activation of the air-fuel ratio sensor 26, the correction of the average amount of fuel injection is executed by use of the air-fuel ratio sensor 26.

The method of calculating the coefficient of the inter-cylinder correction of fuel injection amount is the same as the method employed in Embodiment 1. The feedback control of the average amount of fuel injection is executed by use of the air-fuel ratio sensor 26 so that the air-fuel ratio can be a ratio around the stoichiometric air-fuel ratio (i.e., during Period II). During the execution of the feedback control, the amount of fuel injection of each of the cylinders is controlled so that the average value of the revolution differences of each of the cylinders can converge gradually to zero as shown in FIGS. 15D and 15E. This correction is executed by use of the coefficient of the inter-cylinder correction of fuel injection amount calculated on the basis of the average value of the differences in revolution of the cylinders.

Note that the calculation of the coefficient of the inter-cylinder correction of fuel injection amount does not have to be executed only while the engine is idling after the cold start of the engine. The calculation may also be executed while the engine is idling after the engine warm-up.

In this embodiment, once the coefficient of the inter-cylinder correction of fuel injection amount is calculated, the backup memory keeps the calculated coefficient as a learned value even after the stopping of the engine.

Then, at the cold start of the engine to be carried out later, the amount of fuel injection of each of the cylinders can be executed from a point in time immediately after the start of the engine onwards (the period is referred to as Period III in FIG. 15A) by use of the learned value of the coefficient of the inter-cylinder correction of fuel injection amount stored in the backup memory. Accordingly, the inter-cylinder differences in torque caused by factors other than the unstable combustion can be reduced from the start of the engine onwards.

With this configuration, when the correction of average fuel injection amount is executed in Period III as shown in FIG. 15(b) on the basis of the inter-cylinder differences in revolution, the air-fuel ratio can be prevented from becoming richer as shown in FIG. 15C. To put it differently, with the correction executed in Period III, the air-fuel ratio can be promptly controlled at around the stoichiometric air-fuel ratio. As a consequence, at the start of the engine to be carried out later than the calculation of the coefficient of the inter-cylinder correction of fuel injection amount, the HC discharge amount can be reduced further from the HC discharge amount in the case of Embodiment 1.

Incidentally, the fuel injection valves 7 may be exchanged with new ones or the characteristics of the fuel injection valves 7 may be changed as time progresses. Accordingly, when another feedback control by use of the air-fuel ratio sensor 26 is executed (Period IV in FIG. 15A), the coefficient of the inter-cylinder correction of fuel injection amount is calculated again on the basis of the average value of the differences in revolution of the cylinders.

Now suppose a case where the engine is an engine of the gasoline direct injection type—an engine in which the fuel is injected directly into the combustion chamber—and where the fuel is injected so that the concentration of the air-fuel mixture near the spark plug 21 can be higher than the other portions of the combustion chamber. In this case, even if the air-fuel ratio (the air-fuel ratio of the combustion gas) detected by the air-fuel ratio sensor 26 is close to the stoichiometric air-fuel ratio, the air-fuel ratio near the spark plug 21 sometimes becomes richer approximately to the air-fuel ratio for the maximum torque generation.

Figure 16:
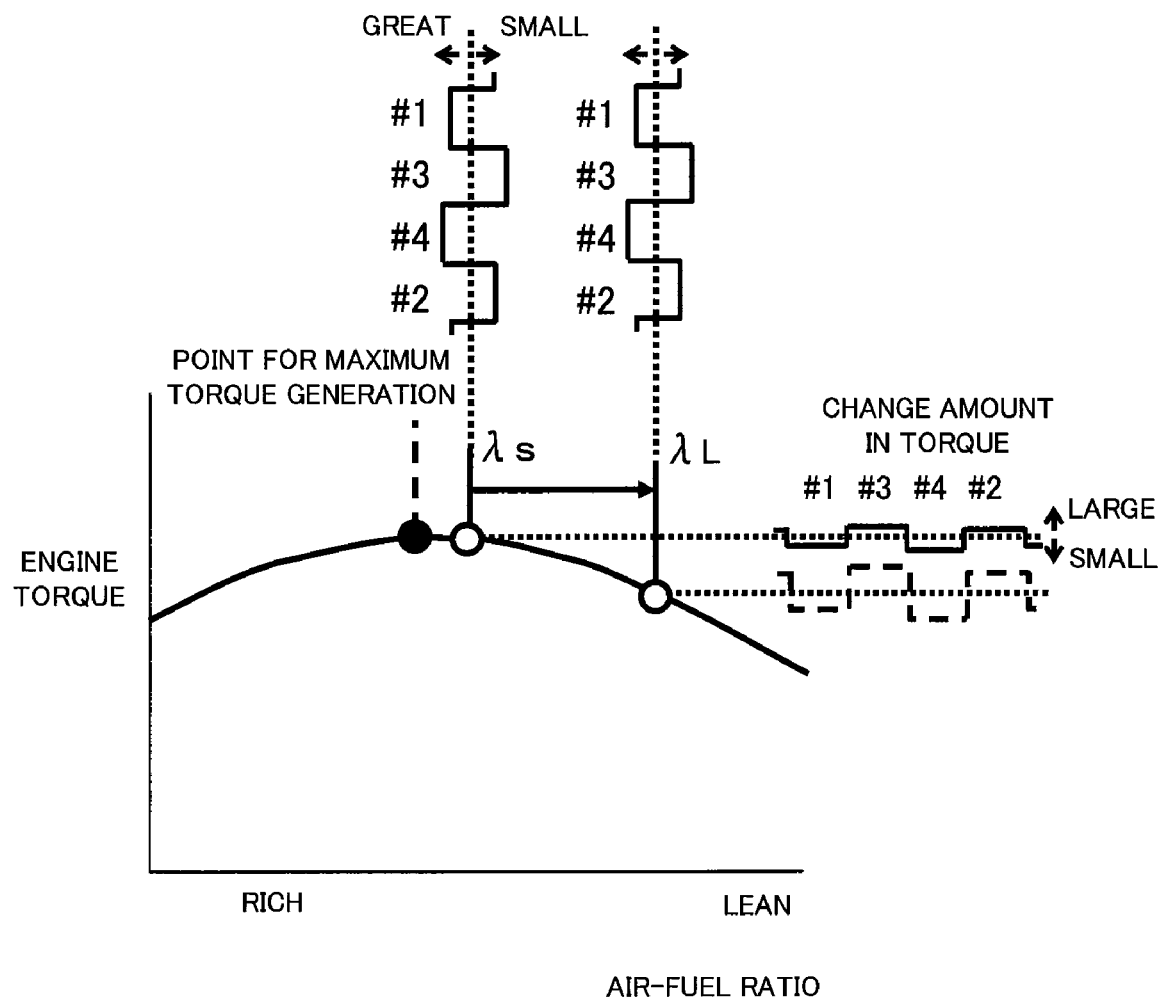
FIG. 16 is a graph illustrating the relationship between the inter-cylinder difference in the amount of fuel injection and the amount of change in torque.

Consequently, the inter-cylinder differences in fuel injection are sometimes unable to be corrected as in the case shown in FIG. 16. Specifically, suppose that the air-fuel ratio detected by the air-fuel ratio sensor 26 (i.e., the average air-fuel ratio of all the cylinders) is controlled at the stoichiometric air-fuel ratio $\lambda s$. In this case, the amount of torque change (represented by the solid line in FIG. 16) relative to the differences in fuel injection of the cylinders is decreased, so that it is more difficult to detect the inter-cylinder differences in fuel injection amount as the average value of the differences in revolution of the cylinders. Thus, the inter-cylinder differences in fuel injection amount are sometimes unable to be corrected.

In an engine of this type, the following measure is taken to address the problem. When the feedback control of the amount of fuel injection is executed by use of the air-fuel ratio sensor 26, the target air-fuel ratio is shifted, temporarily, from the stoichiometric air-fuel ratio $\lambda s$ to a leaner air-fuel ratio $\lambda L$, that is, to an operation point where a larger change in torque is accomplished by the same amount of change in the air-fuel ratio. Accordingly, a larger change in torque can be obtained by the same magnitude of differences in fuel injection amount of the cylinders. The dotted line in FIG. 16 represents the larger change amount in torque.

As a consequence, the differences in fuel injection amount of the cylinders can be corrected by use of the average value of the differences in revolution of the cylinders.

In addition, the above-described fuel-injection control is applicable to a port-injection-type engine in which a fuel injection valve is provided in each intake port. This is because, in a case where only a small amount of fuel deposits on the wall of the combustion chamber, the concentration of the air-fuel mixture near the spark plug 21 becomes richer towards the air-fuel ratio for the maximum torque generation.

Note that the configuration of the control apparatus of this Embodiment and the configuration of the engine control apparatus to which the present invention is applied are the same as their respective counterparts in Embodiment 1.

A control routine of the control apparatus according to Embodiment 2 will be described with reference to the flowchart shown in FIG. 17. The processing of Step 100 and that of Step 105 are the same as their counterparts in Embodiment 1.

Next, a description will be given as to the routine for the determination as to the pre-requisites for calculating the coefficient of the inter-cylinder correction of fuel injection amount calculation at Step 600 in FIG. 17. The description will be given with reference to the flowchart shown in FIG. 18.

The determination routine begins with a determination as to whether the temperature of the engine (for example, the temperature of the cooling water) is or is not within a predetermined range from TCL to TCH (Step 700). This temperature range from TCL to TCH for the calculating the coefficient of the inter-cylinder correction of fuel injection amount is not limited to the temperature range for executing the correction of average fuel injection amount on the basis of the inter-cylinder differences in revolution. Alternatively, the temperature range from TCL to TCH may include a higher temperature of the engine that has already been warmed-up. If the coefficient of the inter-cylinder correction of fuel injection amount is calculated after the warming up of the engine, the calculated coefficient of the inter-cylinder correction of fuel injection amount is stored, as a learned value, in the backup memory, and will be used later in the correction of the amount of fuel injection of each of the cylinders at the cold start of the engine.

The determination at Step 220 as to the idling is the same as its counterpart in Embodiment 1.

If the pre-requisites listed in Step 700 and in Step 220 are satisfied, a determination will be made as to whether the air-fuel ratio is or is not suitable for the calculation of the coefficient of the inter-cylinder correction of fuel injection amount (Step 710).

As described above, the air-fuel ratio for calculating the coefficient of the inter-cylinder correction of fuel injection amount must be leaner than the air-fuel ratio for the maximum torque generation. In Embodiment 2, a determination is made as to whether the feedback control of the average amount of fuel injection is or is not being executed by use of the air-fuel ratio sensor 26 and, in addition, whether the air-fuel ratio does or does not converge to the target air-fuel ratio. If the air-fuel ratio feedback control is being executed and, in addition, if the air-fuel ratio converges to the target air-fuel ratio, it is determined that the pre-requisite for calculating the coefficient of the inter-cylinder correction of fuel injection amount is satisfied (Step 240).

Suppose a case where the accuracy with which the inter-cylinder differences in fuel injection amount is detected is to be improved by setting, as described above, the target air-fuel ratio of the air-fuel ratio feedback control at an air-fuel ratio that is leaner than the stoichiometric air-fuel ratio. In this case, the target air-fuel ratio of the air-fuel ratio feedback control is temporarily shifted to a leaner ratio for a predetermined length of time that is needed for calculating the coefficient of the inter-cylinder correction of fuel injection amount. Then, if the air-fuel ratio converges to the newly set target air-fuel ratio, it is determined that the pre-requisite for calculating the coefficient of the inter-cylinder correction of fuel injection amount is satisfied.

In this determination, besides the pre-requisite that the air-fuel ratio feedback control is being executed, the lowering of the post-engine-start increased fuel injection amount down to as low as a predetermined value or below that, and a predetermined length of elapsed time or longer that has passed since the start of the engine as in the case of Embodiment 1 may be used as pre-requisites to be satisfied before the coefficient of the inter-cylinder correction of fuel injection amount is calculated.

If any one of the pre-requisites listed in Step 700, Step 220, and Step 710 is not satisfied, it is determined that the pre-requisites for calculating the coefficient of the inter-cylinder correction of fuel injection amount are not satisfied (Step 250).

Figure 17:
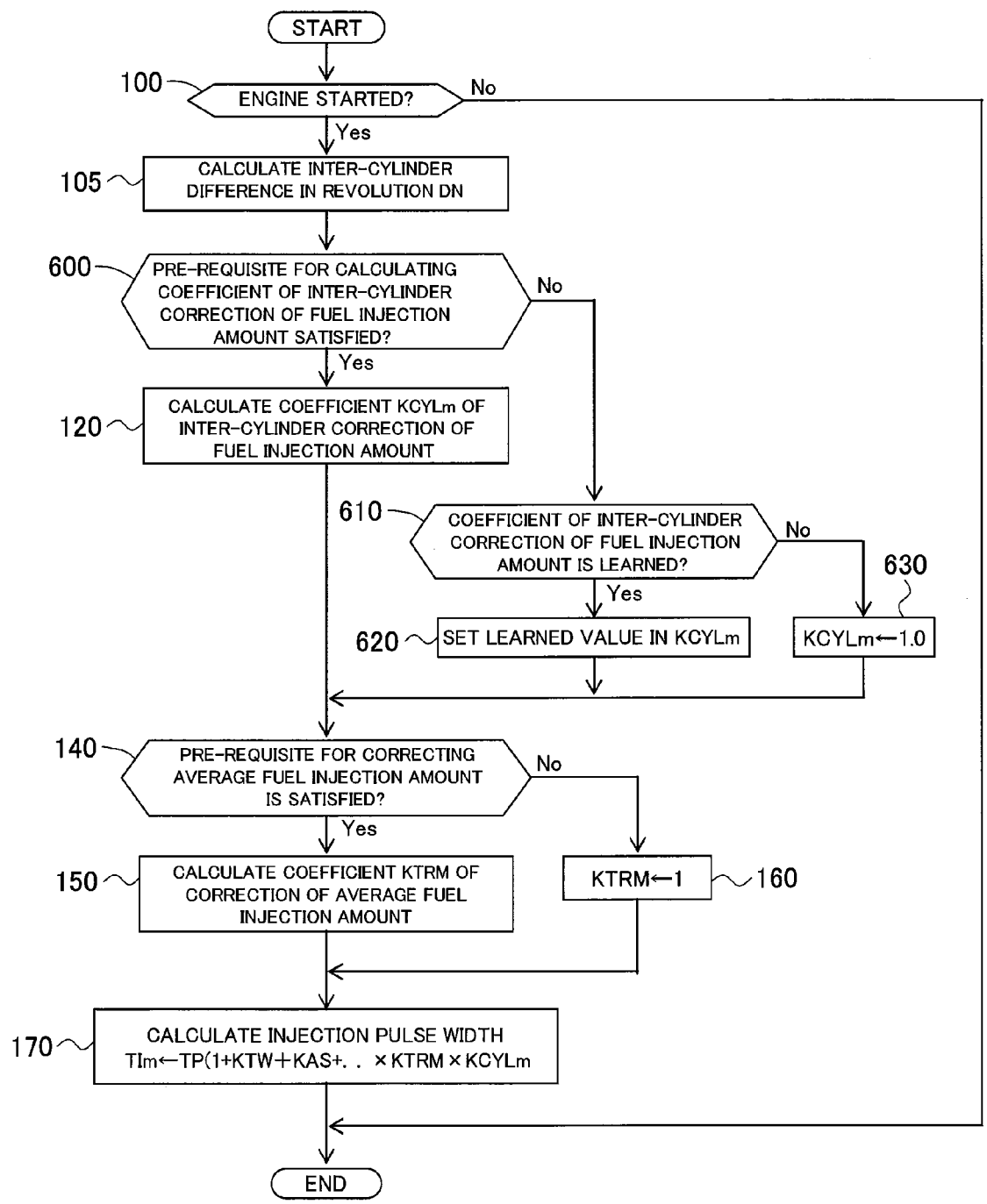
FIG. 17 is a control flowchart of a control apparatus of Embodiment 2.
Figure 18:
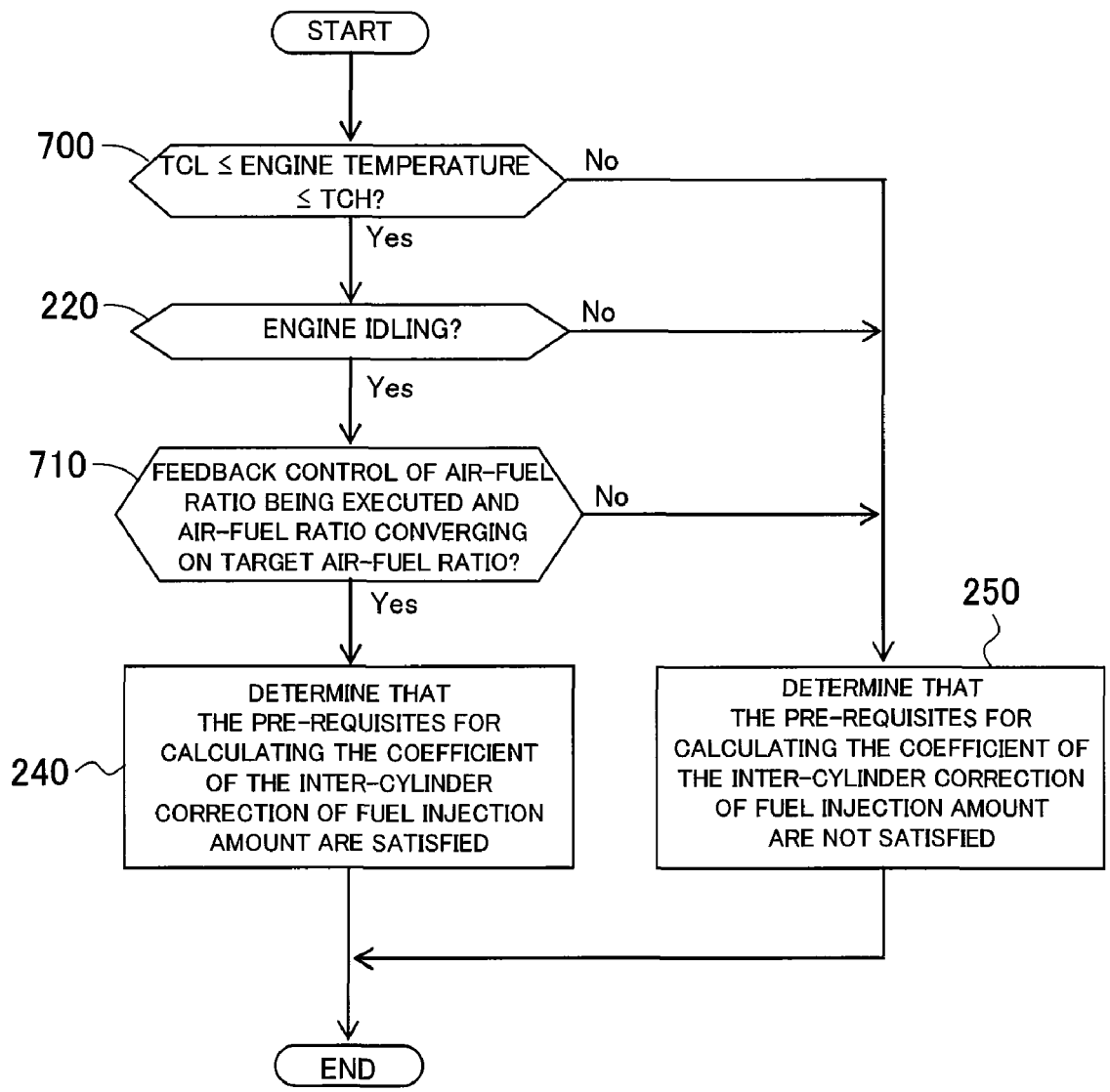
FIG. 18 is a control flowchart of the inter-cylinder correction of the amount of fuel injection of Embodiment 2.

If the pre-requisite for calculating the coefficient of the inter-cylinder correction of fuel injection amount in Step 600 of FIG. 17 is not satisfied, a determination is made as to whether the coefficient of the inter-cylinder correction of fuel injection amount has already been learned or not. To put it differently, a determination is made as to whether the coefficient of the inter-cylinder correction of fuel injection amount has already been calculated and the calculated coefficient of the inter-cylinder correction of fuel injection amount has already been stored in the backup memory before the current occasion of driving (Step 610). If the coefficient of the inter-cylinder correction of fuel injection amount has already been learned, the coefficient of the inter-cylinder correction of fuel injection amount (learned value) stored in the backup memory is loaded as the coefficient $KCYL_m$ of the inter-cylinder correction of fuel injection amount (Step 620).

If it is determined in Step 610 that the coefficient of the inter-cylinder correction of fuel injection amount has not been calculated yet, a value 0 is given to the coefficient $KCYL_m$ of the inter-cylinder correction of fuel injection amount, and the inter-cylinder correction of fuel injection amount will not be executed (Step 630).

In Embodiment 1, as described above, the coefficient of the inter-cylinder correction of fuel injection amount is not calculated by use of the average value of the revolution differences of each of the cylinders because there is a case where the air-fuel ratio immediately after the start of the engine is lower than the air-fuel ratio for the maximum torque generation. In Embodiment 2, if the coefficient of the inter-cylinder correction of fuel injection amount has already been calculated and stored in the backup memory before the current occasion of driving, the correction of the amount of fuel injection for each of the cylinders can be started immediately after the start of the engine by use of the stored coefficient of the inter-cylinder correction of fuel injection amount. Accordingly, the average torques of the cylinders can be equalized by the early execution of the correction. As a consequence, when the correction of average fuel injection amount is executed on the basis of inter-cylinder differences in revolution, the production of a rich air-fuel ratio can be avoided. The air-fuel ratio can be controlled so as to reach, earlier than otherwise, a ratio around the stoichiometric air-fuel ratio. As a consequence, the reduction of HC discharge amount can be started immediately after the start of the engine.

Note that the method of calculating the coefficient of the correction of average fuel injection amount described from Step 140 to Step 160 of FIG. 17 and the method of calculating the injection pulse width at Step 170 are the same as their respective counterparts in Embodiment 1.

In Embodiment 2, once the coefficient of the inter-cylinder correction of fuel injection amount has been calculated and stored in the backup memory, the stored coefficient of the inter-cylinder correction of fuel injection amount (leaned value) can be used, at every start of the engine in the future, for the purpose of correcting the amount of fuel injection of each of the cylinders. Accordingly, the average torques of the cylinders are equalized from the time immediately after the start of the engine, and thus the production of a rich air-fuel ratio at the correction of average fuel injection amount can be avoided even in this early period.

Note that, in Embodiment 2, at the start of the engine immediately after the backup memory is initialized by, for example, removing the battery, the inter-cylinder correction of fuel injection amount is not executed until the air-fuel ratio becomes leaner than the air-fuel ratio for the maximum torque generation (until the pre-requisite for calculating the coefficient of the inter-cylinder correction of fuel injection amount is satisfied). In this case, the production of a rich air-fuel ratio cannot be avoided at the correction of average fuel injection amount.

By contrast, in Embodiment 3, when the engine starts for the first time since the initialization of the backup memory, the average torques of the cylinders are equalized from the time immediately after the start of the engine, that is, even in a period in which the coefficient of the inter-cylinder correction of fuel injection-amount cannot be calculated. Accordingly, in Embodiment 3, the production of a rich air-fuel ratio at the correction of average fuel injection amount can be avoided even in this early period.

Figure 19:
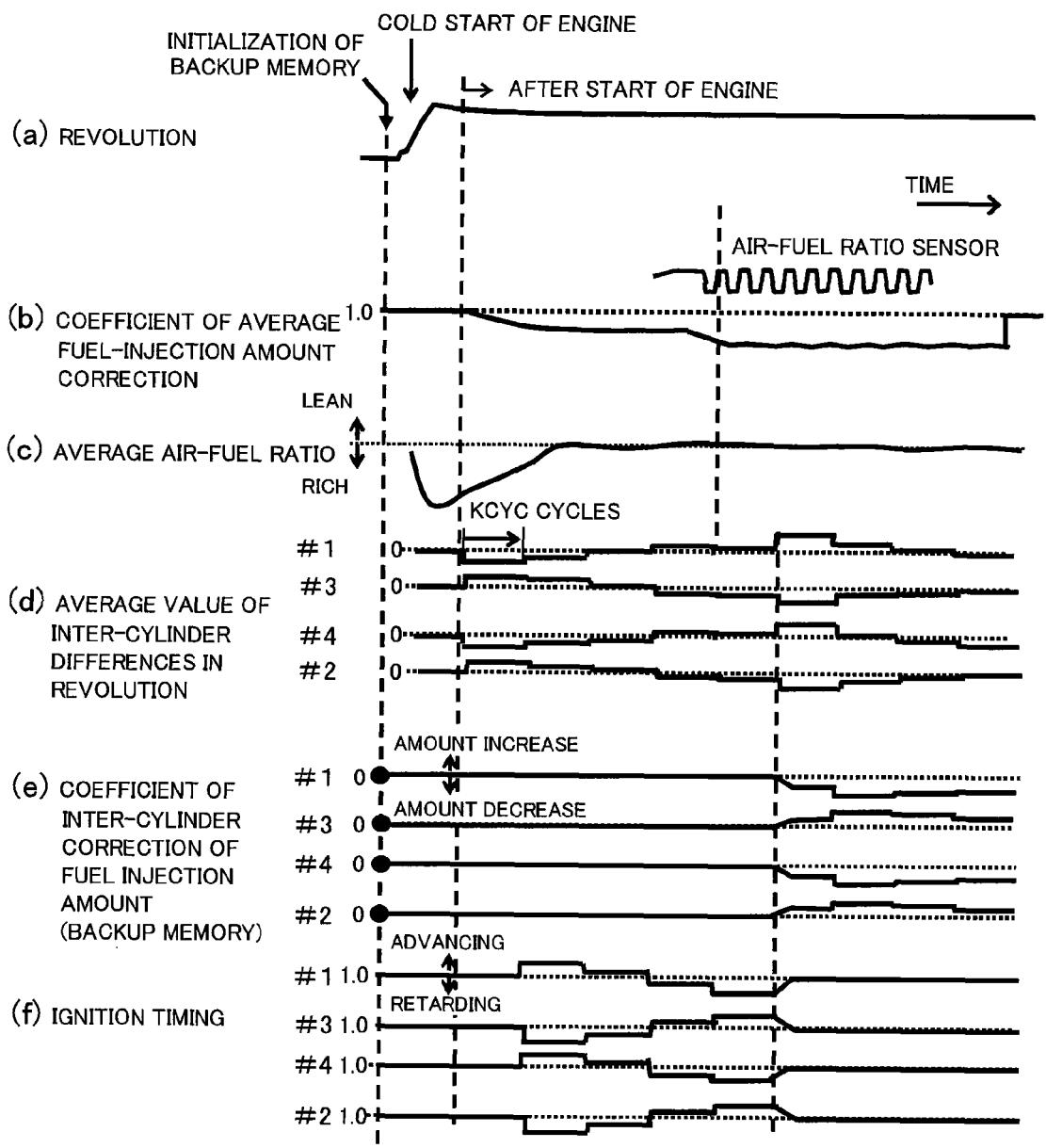
FIG. 19 is a time chart illustrating the operation of a control apparatus for a multi-cylinder internal combustion engine according to Embodiment 3 of the present invention.

An operation of the control apparatus of Embodiment 3 will be described with reference to FIG. 19. When the engine starts for the first time since the initialization of the backup memory, the average value of the revolution differences for each cylinder is calculated over KCYC cycles after the start of the engine as shown in FIG. 19D.

As describe above, the air-fuel ratio immediately after the start of the engine sometimes becomes richer than the air-fuel ratio for the maximum torque generation. With a richer air-fuel ratio, the direction of the torque change caused by a change in the air-fuel ratio is opposite to the corresponding direction of a case where the air-fuel ratio is leaner than the air-fuel ratio for the maximum torque. Accordingly, if the amount of fuel injection is corrected on the basis of the average value of the differences in revolution for the cylinders, the amount of fuel injection is erroneously corrected so as to increase the differences in average torque for the cylinders. As a consequence, the inter-cylinder differences in torque cannot be reduced.

By contrast, in Embodiment 3, the ignition timing of each of the cylinder is corrected on the basis of the average value of the differences in revolution for the cylinders. Accordingly, the differences in average torque among the cylinders can be reduced immediately after the start of the engine.

Figure 20:
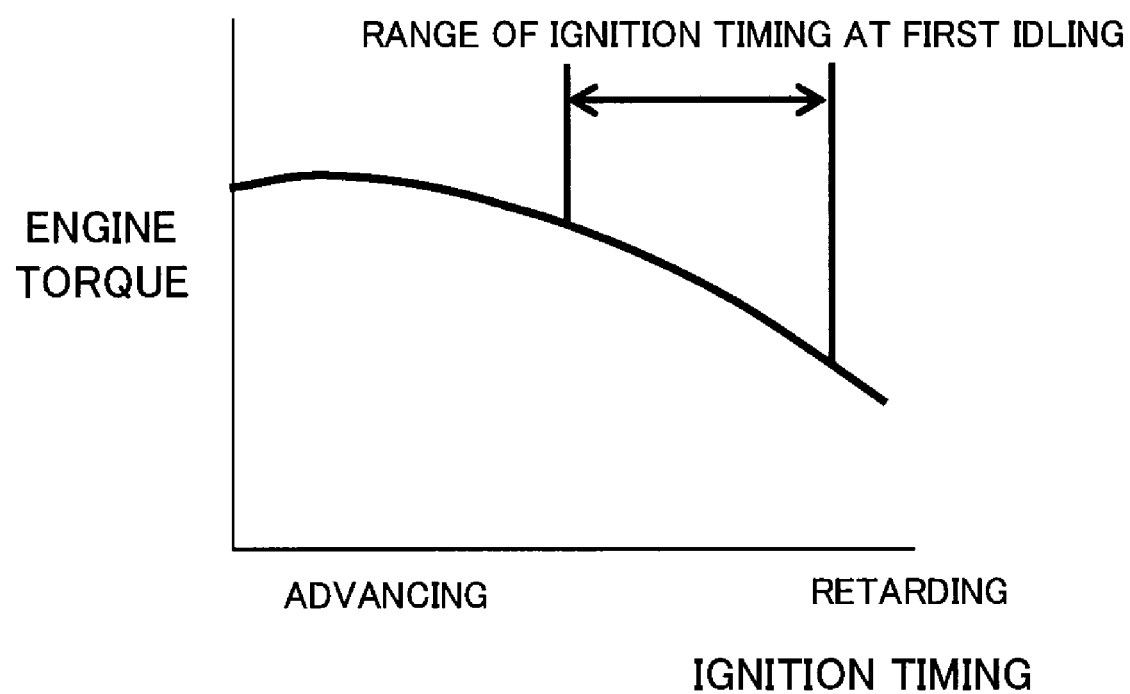
FIG. 20 is a graph illustrating the relationship between the ignition timing and the torque.

Commonly, while the engine is idling after the cold start of the engine (i.e., during the first idling), the ignition timing is retarded from the ignition timing for the maximum torque as shown in FIG. 20. Accordingly, the retarded ignition timing has a torque characteristic curve with a monotonically-decreasing inclination irrespective of the air-fuel ratio.

For this reason, as FIG. 19F shows, the ignition timing of the cylinder with a small average value of the revolution differences is made to advance so as to increase the torque. Conversely, the ignition timing of the cylinder with a large average value of the revolution differences is retarded so as to decrease the torque.

Accordingly, by correcting the ignition timing of each of the cylinders on the basis of the average value of the revolution differences of each of the cylinders, the average torques of the cylinders can be equalized irrespective of the air-fuel ratio after the start of the engine. With this correction of the ignition timing of each cylinder, the differences in fuel injection amount for each cylinder cannot be corrected, but the air-fuel ratio never has such a low average air-fuel ratio as the one that would result from the correction of average fuel injection amount (see FIG. 19C). Accordingly, even when there are inter-cylinder differences in fuel injection amount, the increase in the HC discharge amount can be avoided. Hereafter, the correction described above will be referred to as the inter-cylinder correction of ignition timing.

As has been described thus far, in Embodiment 3, when the engine starts for the first time since the initialization of the backup memory, the production of a rich air-fuel ratio due to the correction of average fuel injection amount can be avoided from the time immediately after the start of the engine. Accordingly, the increase in the HC discharge amount can be avoided.

Note that, in Embodiment 3, once the air-fuel ratio sensor 26 has been activated and the feedback control of the amount of fuel injection by use of the air-fuel ratio sensor 26 has been started, the amount of fuel injection for each cylinder is corrected, as in the case of Embodiment 2. Accordingly, the amounts of fuel injection for the cylinders are equalized and the average torques of the cylinders are also equalized. Thus, the discharge of the unburned gas that would be caused by the production of a rich air-fuel ratio of a part of the cylinders can be avoided.

A control routine of Embodiment 3 will be described with reference to the flowchart shown in FIG. 21.

The processes listed in Step 100 and Step 105 are the same as their respective counterparts in Embodiment 2.

Suppose a case where the pre-requisite for the inter-cylinder correction of fuel injection amount in Step 600 is not satisfied, and in addition, where the coefficient of the inter-cylinder correction of fuel injection amount has not been learned (the coefficient of the inter-cylinder correction of fuel injection amount has not been calculated before the current occasion of driving) in Step 610. In this case, the inter-cylinder correction of fuel injection amount is stopped in Step 630, but the inter-cylinder correction of ignition timing will be executed in Step 800. Note that the processes listed in Step 600, Step 120, Step 610, Step 620, and Step 630 are the same as their respective counterparts in Embodiment 2.

The processing routine of the inter-cylinder correction of ignition timing in Step 800 will be described below with reference to the flowchart shown in FIG. 22.

To begin with, a determination is made as to whether the pre-requisite for the inter-cylinder correction of ignition timing is or is not satisfied (Step 900). The pre-requisite for the inter-cylinder correction of ignition timing is the same as the pre-requisite for executing the correction of average fuel injection amount (Step 140 in Embodiment 1).

If the pre-requisite for the inter-cylinder correction of ignition timing is not satisfied, a value 0 is given to the amount $ACYL_m$ of the inter-cylinder correction of ignition timing (m represent the cylinder number), and thus the inter-cylinder correction of ignition timing is stopped (Step 930).

If the pre-requisite for inter-cylinder correction of ignition timing is satisfied in Step 900, the average value $AVEDN_m$ of the inter-cylinder differences in revolution is calculated for each of the cylinders through the processes listed in Step 310 to Step 340 and in Step 350 as in the case of Embodiment 1.

Next, the adjustment amount $ACYLSTEP_m$ of the amount $ACYL_m$ of the correction of ignition timing for each cylinder is calculated on the basis of the average value $AVEDN_m$ of the inter-cylinder differences in revolution (Step 910).

Figure 23:
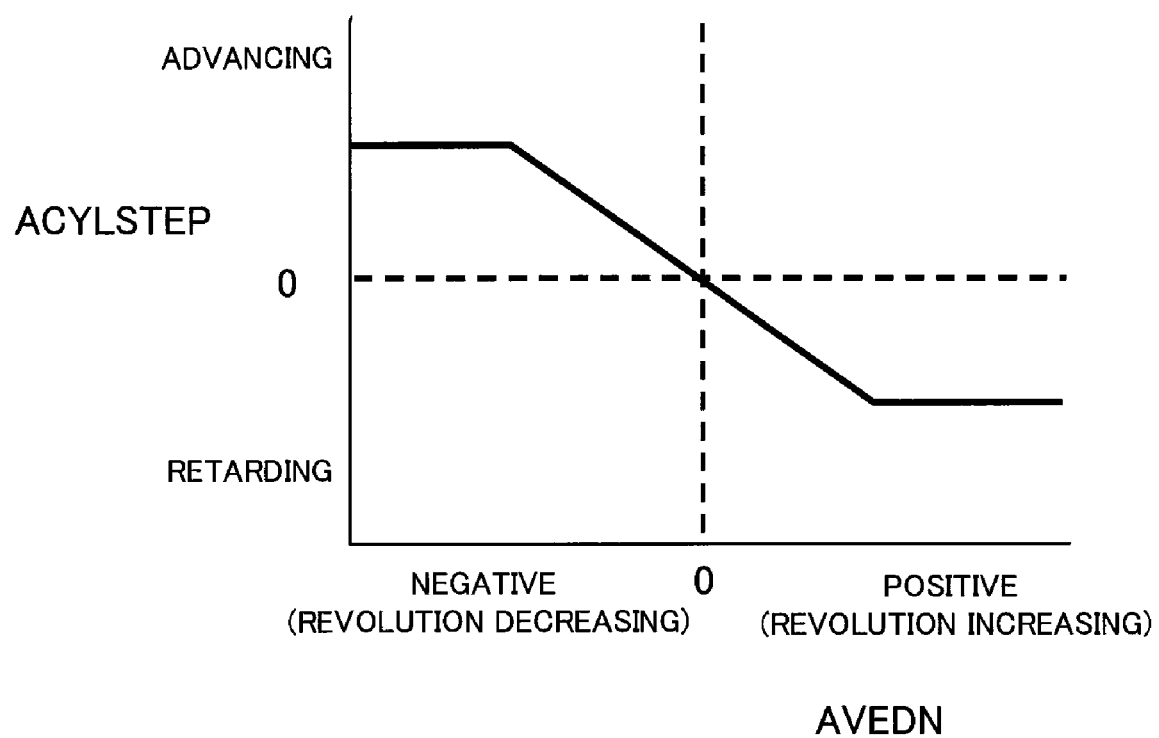
FIG. 23 is a graph illustrating the setting the adjustment value for fuel-injection timing relative to the average value for the inter-cylinder differences in revolution.

The adjustment amount ACYLSTEP has been set beforehand in association with the average value AVEDN of the inter-cylinder differences in revolution by the function illustrated in FIG. 23. If the average value $AVEDN_m$ of the inter-cylinder differences in revolution for the cylinder #m is negative (i.e., located on the revolution-decreasing side in FIG. 23), the adjustment amount $ACYLSTEP_m$ for the cylinder #m will be set so as to make the ignition timing advance by a predetermined angle amount. Conversely, if the average value $AVEDN_m$ of the inter-cylinder differences in revolution for the cylinder #m is positive (i.e., located on the revolution-increasing side), the adjustment amount $ACYLSTEP_m$ for the cylinder #m will be set so as to retard the ignition timing by a predetermined angle amount.

The adjustment amount ACYLSTEP is set by obtaining, through an experiment performed beforehand, the amount of ignition-timing correction that reduces the average value AVEDN of the differences in revolution down substantially to zero.

Figure 22:
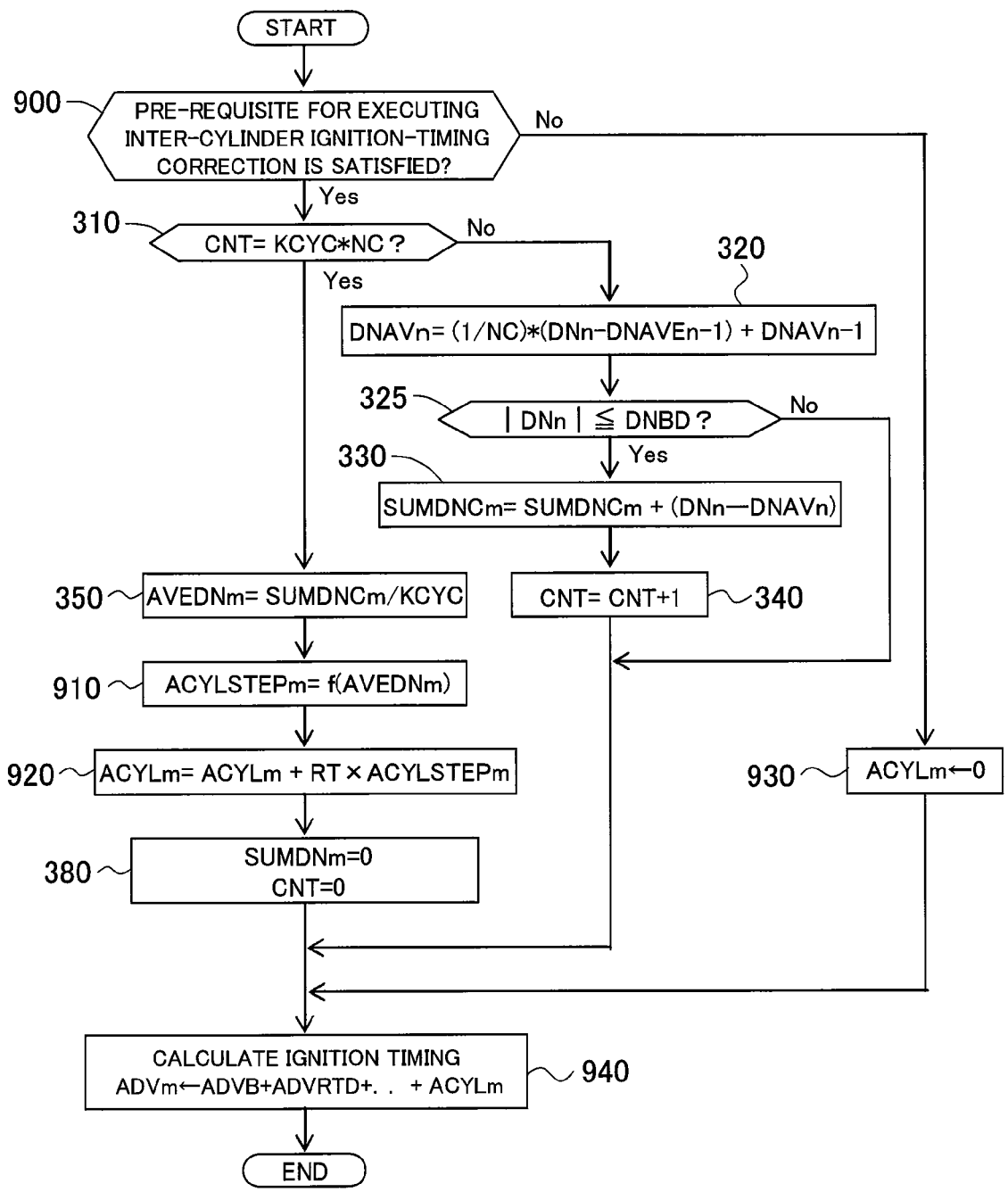
FIG. 22 is a control flowchart of the inter-cylinder correction of injection timing of Embodiment 3.

Next, the amount $ACYL_m$ of the correction of ignition timing for each cylinder is calculated by use of Formula 8 in Step 920 of FIG. 22.

$$ACYL_m = ACYL_m \text{ (value obtained by the previous calculation)} + RT \cdot ACYLSTEP_m \quad \text{(Formula 8)}$$

Here, RT represents the correction gain. By correcting the amount $ACYL_m$ of the correction of ignition timing with the adjustment amount $ACYLSTEP_m$ for the cylinder in accordance with Formula 8 every KCYC cycles, the cylinder with a smaller average value of the differences in revolution (the cylinder with a torque that is smaller than the average torque of all the cylinders) is controlled so that the ignition timing can advance to increase the torque. In contrast, the cylinder with a larger average value of the differences in revolution (the cylinder with a torque that is larger than the average torque of all the cylinders) is controlled so that the ignition timing can be retarded to decrease the torque.

Similar processes will be executed in the following KCYC cycles. Accordingly, both the cumulative memories $SUMDNC_m$ and the cumulated number CNT are initialized in Step 380 as in the case of Embodiment 1.

By repeating these processes every KCYC cycles, the control is executed so that the average value of the differences in revolution of each of the cylinders can be reduced to zero (so that the average torques of the cylinders can be equalized).

The ignition timing $ADV_m$ for each cylinder is calculated in Step 940. The ignition timing $ADV_m$ is calculated by summing up the basic ignition timing ADVB, the amount ADVRTD of ignition-timing retarding correction, and the amount $ACYL_m$ of the correction of ignition timing for each cylinder.

Figure 24:
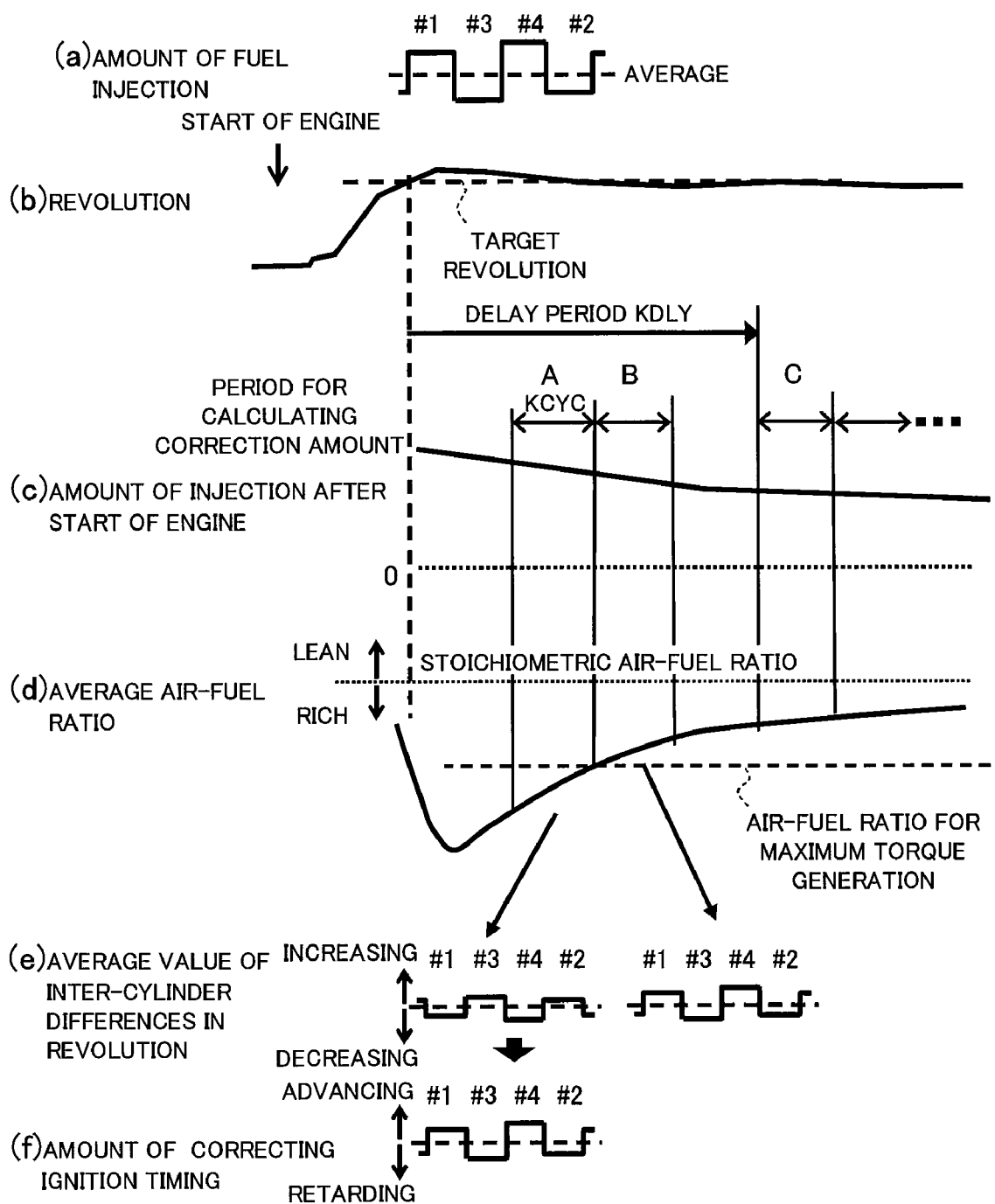
FIG. 24 is a time chart illustrating an exemplar timing to execute the inter-cylinder correction of injection timing.

Now suppose that, when the amount of the inter-cylinder correction of ignition timing is calculated, there are differences in fuel injection amount among the cylinders as shown in FIG. 24A. If the air-fuel ratio after the start of the engine changes at an air-fuel ratio that is close to the air-fuel ratio for the maximum torque generation as in Period A to Period B in FIG. 24D, the change in the average revolution difference of each cylinder caused by the differences in fuel injection amount may possibly turn in the opposite direction as shown in FIG. 24E. The reason for the direction of change in torque relative to the change in air-fuel ratio before the air-fuel ratio for the maximum torque generation is reversed after the air-fuel ratio for the maximum torque generation.

Each of Periods A to C corresponds to a period for calculating the amount of the inter-cylinder correction of ignition timing (i.e., corresponds to a set of KCYC cycles). When the air-fuel ratio changes too rapidly for the length of the period of calculating the amount of the inter-cylinder correction of ignition timing, the direction of the average value of the differences in revolution relative to the differences in fuel injection amount in Period A is reversed in Period B. Accordingly, if the correction of ignition timing is executed in Period B by use of the amount (f) of the inter-cylinder correction of ignition timing calculated on the basis of the average value of the differences in revolution for Period A, the ignition timing may possibly be corrected erroneously so as to increase the inter-cylinder differences in revolution.

When the air-fuel ratio changes slowly for the length of the period of calculating the amount of the inter-cylinder correction of ignition timing, both the direction and the amount of the average value of the differences in revolution change at a moderate speed. Accordingly, the ignition timing can be controlled by the inter-cylinder correction of ignition timing so as to follow the change in the average value of revolution differences, and thus the average torques of the cylinders can be equalized. In contrast, however, when the air-fuel ratio changes rapidly immediately after the start of the engine, both the direction and the amount of the average value of the revolution differences change rapidly, so that the ignition timing may possibly be erroneously corrected.

If this is the case, for the purpose of avoiding an erroneous correction of ignition timing, the calculation of the amount of the inter-cylinder correction of ignition timing may be executed in a period where the change in the air-fuel ratio becomes small (in Period C onwards).

If the above-described control is executed, the timing at which the change in the air-fuel ratio after the start of the engine becomes small is set, in advance, as a delay period KDLY after the start of the engine. The amount of the inter-cylinder correction of ignition timing is not calculated until the length of time that has passed since the start of the engine exceeds the delay period KDLY. In this example, at the start of the engine, the calculation of the amount of the inter-cylinder correction of ignition timing is executed only after a length of time corresponding to the delay period KDLY has passed since the engine exceeded the target revolution for the idling.

Figure 25:
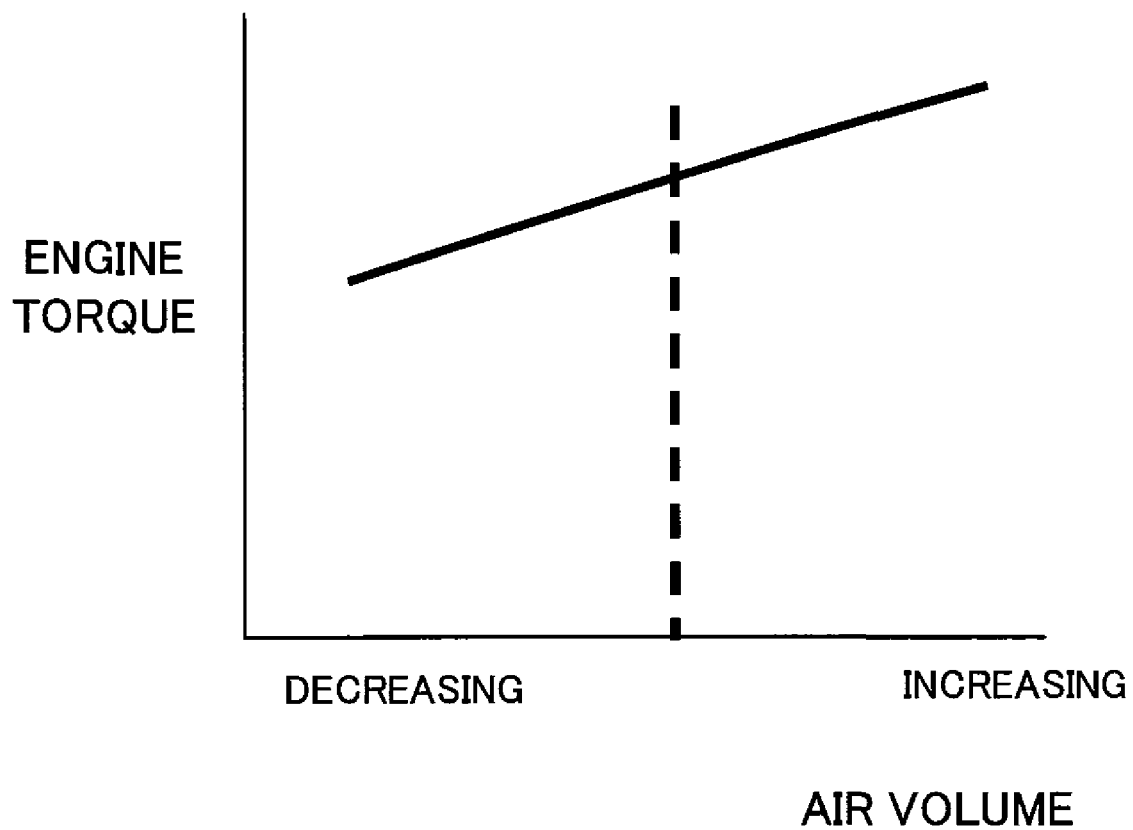
FIG. 25 is a graph illustrating the relationship between the volume of air and the torque.

In addition, a control is executed, in this embodiment, by correcting the ignition timing of each cylinder, so as to equalize the average torques of the cylinders. FIG. 25 shows that as the air volume increases, the torque increases monotonically. Accordingly, if the engine is an engine equipped with an adjustment system capable of adjusting, individually for each of the cylinders, the action timing and the lifting amount of each of the intake and exhaust valves, or if the engine is an engine equipped with throttle valves provided respectively for the cylinders, the equalization of the average torques of the cylinders may be accomplished by adjusting, individually for each of the cylinder, the air volume to be supplied in each cylinder. To carry out the individual adjustment, the action timing of each valve, the lifting amount of each valve, or the angle of each throttle valve may be adjusted individually for each cylinder.

Figure 21:
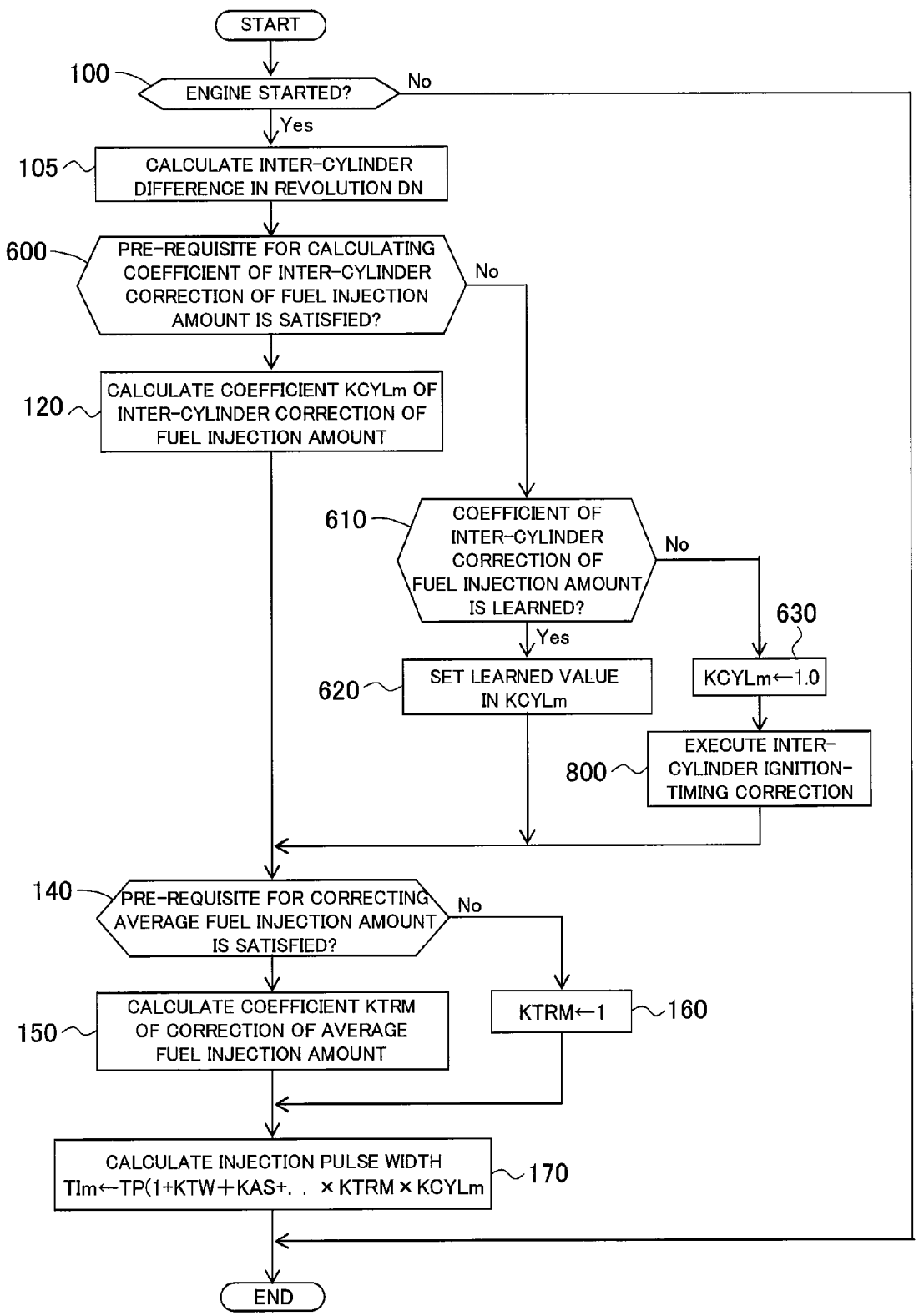
FIG. 21 is a control flowchart of a control apparatus of Embodiment 3.

The processes of the correction of average fuel injection amount in FIG. 21 (Step 140 to Step 160) and the calculation of the injection pulse width (Step 170) are the same as their respective counterparts in Embodiment 1. The average fuel injection amount of all the cylinders is adjusted on the basis of the inter-cylinder differences in revolution.

In this embodiment, as described above, when the engine starts for the first time since the initialization of the backup memory, a control is executed by the inter-cylinder correction of ignition timing so that the average torques of the cylinders can be equalized even in a period immediately after the start of the engine when the coefficient of the inter-cylinder correction of fuel injection amount cannot be calculated. Thus accomplished is a decrease in the part of the influence caused by factors other than the unstable combustion on the inter-cylinder differences in revolution. As a consequence, the production of a rich air-fuel ratio at the correction of average fuel injection amount and the increase in the HC discharge amount can be avoided from the first start of the engine since the initialization of the backup memory.

Note that, in this embodiment, once the pre-requisite for calculating the coefficient of the inter-cylinder correction of fuel injection amount, the amount of fuel injection for each cylinder is adjusted by use of the calculated value of the coefficient of the inter-cylinder correction of fuel injection amount. Accordingly, the inter-cylinder differences in fuel injection amount are corrected, so that an increase in the HC discharge amount caused by the production of a rich air-fuel ratio in a part of the cylinders can be avoided as in the cases of Embodiments 1 and 2.

EXPLANATION OF REFERENCE NUMERALS 1 revolution measuring means
2 means for calculating the inter-cylinder differences in revolution
3 means for averaging the inter-cylinder differences in revolution
4 means for calculating the basic injection amount
5 means for correcting the average injection amount
6 means for inter-cylinder correction of the injection amount
7 fuel injection valve
8 means for calculating the basic ignition timing
9 means for inter-cylinder correction of the ignition timing
10 ignition coil
13 intake manifold
14 intake-air-volume measuring means
16 intake port
17 crank-angle detecting plate
18 crank-angle sensor
19 intake-pipe pressure sensor
26 air-fuel ratio sensor
27 cooling-water temperature sensor
40 controller (control apparatus)

What is claimed is:

1. A control apparatus for a multi-cylinder internal combustion engine equipped with fuel injection valves provided respectively for the cylinders comprising:
 a revolution measuring means for measuring a revolution speed for a predetermined angle for each-cylinder;
 an inter-cylinder revolution-difference calculating means for calculating, from the measured revolution speed, a difference in revolution speed between a cylinder of current explosion and a cylinder of the previous explosion;
 an injection amount correcting means for adjusting the average amount of injection of the fuel injection valves of all the cylinders in accordance with the inter-cylinder differences in revolution speed after the cold start of the engine calculated by the inter-cylinder revolution-difference calculating means;
 an inter-cylinder revolution-difference averaging means for averaging the differences in revolution speed; calculated by the inter-cylinder revolution-difference calculating means, each between the cylinder of current explosion and the cylinder of the previous explosion;
 an inter-cylinder ignition-timing correcting means for adjusting the ignition timing of each cylinder so that the average value of the inter-cylinder revolution differences calculated by the inter-cylinder revolution-difference averaging means can be reduced close to zero from the start of the engine until the average air-fuel ratio of all the cylinders becomes leaner than an air-fuel ratio for the maximum torque generation; and
 an inter-cylinder injection amount correcting means for adjusting the amount of injection of the fuel injection valve of each cylinder so that the average value of the inter-cylinder revolution differences calculated by the inter-cylinder revolution-difference averaging means can be reduced close to zero once the average air-fuel ratio of all the cylinders has become leaner than the air-fuel ratio for the maximum torque generation after the start of the engine.

2. The control apparatus for a multi-cylinder internal combustion engine according to claim 1, wherein, the inter-cylinder injection amount correcting means adjusts the amount of injection of the fuel injection valve of each cylinder a predetermined length of time after the start of the engine so that the average value of the inter-cylinder revolution differences calculated by the inter-cylinder revolution-difference averaging means can be reduced close to zero.

3. The control apparatus for a multi-cylinder internal combustion engine according to claim 2,
 wherein the predetermined length of time is defined as a length of time that has passed since the start of the engine till the amount of injection is reduced down as low as a predetermined level, and
 after the predetermined length of time has passed, the inter-cylinder injection amount correcting means adjusts the amount of injection of the fuel injection valve of each cylinder so that the average value of the inter-cylinder revolution differences calculated by the inter-cylinder revolution-difference averaging means can be reduced close to zero.

4. The control apparatus for a multi-cylinder internal combustion engine according to claim 3,
 wherein the inter-cylinder injection amount correcting means calculates a correction value for the amount of injection of the fuel injection valve of each cylinder so that the average value of the inter-cylinder revolution differences calculated by the inter-cylinder revolution-difference averaging means can be reduced close to zero,
 the inter-cylinder injection amount correcting means adjusts the amount of injection of the fuel injection valve of each cylinder by use of the calculated correction value for the amount of injection of each cylinder,
 the inter-cylinder injection amount correcting means stores the correction value for the amount of injection of each cylinder in a memory, and
 at a start of the engine after the correction value for the amount of injection of each cylinder is stored in the memory, the inter-cylinder injection amount correcting means adjusts the amount of injection of the fuel injection valve by use of the correction value for the amount of injection of each cylinder stored in the memory until the predetermined length of time has passed since the start of the engine.

5. The control apparatus for a multi-cylinder internal combustion engine according to claim 2,
 wherein the inter-cylinder injection amount correcting means calculates a correction value for the amount of injection of the fuel injection valve of each cylinder so that the average value of the inter-cylinder revolution differences calculated by the inter-cylinder revolution-difference averaging means can be reduced close to zero,
 the inter-cylinder injection amount correcting means adjusts the amount of injection of the fuel injection valve of each cylinder by use of the calculated correction value for the amount of injection of each cylinder,
 the inter-cylinder injection amount correcting means stores the correction value for the amount of injection of each cylinder in a memory, and
 at a start of the engine after the correction value for the amount of injection of each cylinder is stored in the memory, the inter-cylinder injection amount correcting means adjusts the amount of injection of the fuel injection valve by use of the correction value for the amount of injection of each cylinder stored in the memory until the predetermined length of time has passed since the start of the engine.

6. The control apparatus for a multi-cylinder internal combustion engine according to claim 1,
   wherein while a feedback control of the amount of injection is executed by use of an air-fuel sensor so that a predetermined target air-fuel ratio that is leaner than an air-fuel ratio for the maximum torque generation can be accomplished, the inter-cylinder injection amount correcting means calculates the correction value for the amount of injection of the fuel injection valve of each cylinder so that the average value of the inter-cylinder revolution differences calculated by the inter-cylinder revolution-difference averaging means can be reduced close to zero,
   the inter-cylinder injection amount correcting means stores the correction value for the amount of injection of each cylinder in a memory, and
   at a start of the engine after the correction value for the amount of injection of each cylinder is stored in the memory, the inter-cylinder injection amount correcting means adjusts the amount of injection of the fuel injection valve by use of the correction value for the amount of injection of each cylinder stored in the memory from the start of the engine until the start of the feedback control of the amount of injection by use of the air-fuel ratio sensor.

7. The control apparatus for a multi-cylinder internal combustion engine according to claim 6, wherein the target air-fuel ratio is a theoretical air-fuel ratio.

8. The control apparatus for a multi-cylinder internal combustion engine according to claim 7,
   wherein the inter-cylinder injection amount correcting means shifts the target air-fuel ratio for the feedback control of the amount of injection so that the shifted air-fuel ratio will be leaner than the theoretical air-fuel ratio at the timing when the inter-cylinder injection amount correcting means calculates the correction value for the amount of injection of each cylinder,
   the inter-cylinder injection amount correcting means calculates the correction value for the amount of injection of the fuel injection valve of each cylinder so that the average value of the inter-cylinder revolution differences calculated by the inter-cylinder revolution-difference averaging means can be reduced close to zero while the air-fuel ratio is controlled so as to be the target air-fuel ratio shifted to be leaner than the theoretical air-fuel ratio, and
   the inter-cylinder injection amount correcting means adjusts the amount of injection of the fuel injection valve of each cylinder by use of the calculated correction value for the amount of injection of each cylinder.

9. The control apparatus for a multi-cylinder internal combustion engine according to claim 6,
   wherein the inter-cylinder injection amount correcting means shifts the target air-fuel ratio for the feedback control of the amount of injection so that the shifted air-fuel ratio will be leaner than the theoretical air-fuel ratio at the timing when the inter-cylinder injection amount correcting means calculates the correction value for the amount of injection of each cylinder,
   the inter-cylinder injection amount correcting means calculates the correction value for the amount of injection of the fuel injection valve of each cylinder so that the average value of the inter-cylinder revolution differences calculated by the inter-cylinder revolution-difference averaging means can be reduced close to zero while the air-fuel ratio is controlled so as to be the target air-fuel ratio shifted to be leaner than the theoretical air-fuel ratio, and
   the inter-cylinder injection amount correcting means adjusts the amount of injection of the fuel injection valve of each cylinder by use of the calculated correction value for the amount of injection of each cylinder.

\* \* \* \* \*